United States Patent [19]

McCrocklin et al.

[11] Patent Number: 4,761,733
[45] Date of Patent: Aug. 2, 1988

[54] DIRECT-EXECUTION MICROPROGRAMMABLE MICROPROCESSOR SYSTEM

[75] Inventors: Andrew J. McCrocklin; Nicholas E. Aneshansley, both of San Diego; Patricia Shanahan, Escondido; James J. Whelan, San Diego; Jeffrey P. Anderson; James E. Kocol, both of Escondido; Gary L. Riddle, Poway, all of Calif.

[73] Assignee: Celerity Computing, San Diego, Calif.

[21] Appl. No.: 710,615

[22] Filed: Mar. 11, 1985

[51] Int. Cl.[4] ............................................. G06F 9/22
[52] U.S. Cl. .................................................. 364/200
[58] Field of Search ... 364/200 MS File, 900 MS File

[56] References Cited

U.S. PATENT DOCUMENTS 4,407,016 9/1983 Bayliss et al. ...................... 364/200

OTHER PUBLICATIONS

Ohr, "Risc Machines", *Electronic Design*, Jan. 10, 1985.
Markoff, "Risc Chips", *Byte*, Nov. 1984.
Patterson, "Reduced Instruction Set Computers", *Communications of the ACM*, Jan. 1985, vol. 28, No. 1.
"How a 100-Year Old Computer Company Got into Microelectronics", NCR Microelectronics Division.
"NCR/32-000 32-Bit Microprogrammable microprocessor", NCR Microelectronics Division.
NCR General Information Manual, NCR Corporation.

*Primary Examiner*—Raulfe B. Zache
*Attorney, Agent, or Firm*—Lyon & Lyon

[57] ABSTRACT

A direct-execution microprogrammable microprocessor system uses an emulatory microprogrammable microprocessor for direct execution of microinstructions in main memory through a microinstruction port. A microinstruction cache with a microinstruction address extension unit serving to communicate microinstructions from the main memory to the microprogrammable microprocessor. Virtual main memory accesses occur through a system multiplexer. A virtual address extension unit and a virtual address bus provide extension and redefinition of the main memory address space of the microprogrammable microprocessor. The system also uses a context switching stack cache and an expanded address translation cache with the microprogrammable microprocessor having a reduced and redefined microinstruction set with a variable microinstruction cycle.

20 Claims, 11 Drawing Sheets

DIRECT-EXECUTION MICROPROGRAMMABLE MICROPROCESSOR SYSTEM

BACKGROUND

The present invention relates to computer systems and more specifically to microprogrammable microprocessor systems.

Modern computer systems typically include a microprogrammable microprocessor (MMP), e.g. NCR 32000, and a real memory connected together by a processor memory bus. The MMP fetches instructions and data from real memory and executes those instructions and manipulates data. The real memory is typically made of random access memory (RAM). This RAM stores microinstructions.

The MMP is also connected to an instruction storage unit (ISU) which is a microinstruction memory made of read only memory (ROM), through an instruction storage unit bus (ISUB).

Emulatory Execution of Microcode in ROM

The MMP fetches a sequence of macroinstructions from real memory. For each fetched macroinstruction, the microprogrammable microprocessor system begins to execute a series of microinstructions in ROM so as to effectuate the intended result of the macroinstructions, that is, to emulate the macroinstruction. Thus, for each type of macroinstruction, a series of microinstructions is executed. Hence, the ROM would typically be organized in groups of serial microinstructions with each group corresponding to those instructions necessary to emulate a macroinstruction.

Microinstructions and macroinstructions stored in ROM and RAM, respectively, has been used as result of the cost performance consideration of real memory. Typically, real memory is embodied in semiconductor RAM technology. This semiconductor technology is relatively expensive. When executing large programs, it is cost effective to emulate the macroinstructions through microinstruction execution.

A problem with this emulatory microinstruction execution is the overhead execution associated with the macroinstruction, in that, the macroinstruction must be fetched and several microinstructions must be executed for placing the MMP in a state to compute the macroinstruction result. This overhead execution decreases system performance.

Another problem with this macro-microinstruction dichotomy is the non-overlap of microinstructions and macroinstructions, in that, the sequence of reading a macroinstructions and then executing a series of microinstructions prior to the fetching and execution of the next macroinstruction prevents overlap of the accesses to the ROM and real memory. This non-overlap fetching and accessing degrades system performance, in that, the ISUB or the processor memory bus is inactive at any given time.

Because of the need to have large bulk storage available to users of computer systems, designers have incorporated a real-virtual partition in their memory architecture. Typically, real memory will comprise semiconductor technology which is fast but expensive, and bulk storage magnetic devices which are slow but inexpensive with the cost is in terms of dollars per bit of information. The MMP will have access to real memory wherein is stored pages of memory that are mapped to portions of an entire memory space such that the real memory locations are a small portion of the total address space where the remaining memory locations are stored in the bulk storage devices. Hence, modern computer systems have maintained a real-virtual memory dichotomy which complicates system architecture so as to effectively use high performance expensive semiconductor memory and inexpensive bulk storage devices in a cost effective manner.

Another complication of modern computer architecture with respect to the real-virtual memory dichotomy is the need for special I/O controls to enable communications between the MMP, real memory and bulk storage devices.

Context Switching

Modern computer systems generally operate in a parallel processing mode, in that, at any one given time, multiple programs, that is processes, are being executed with a computer operating system keeping track of which processes are presently being concurrently executed and keeping track of status and parameter information of the processes. The operating system saves status and parameter information of an interrupted process when switching to another process and subsequently restores this information when switching back to the interrupted process. This switching has been commonly referred to as context switching. During context switching, it is necessary to maintain process information particular to the various concurrently executed processes. Hence, a problem with modern computer systems is the execution of overhead instructions for saving information when switching between various processes.

Microcode Address Space

Another problem with microprogrammable microprocessor systems using a ROM for storing microinstructions for emulating macroinstructions stored in real memory, is the limited address space typically provided by such microprogrammable microprocessor systems. The ISUB is typically a 16 bit wide bus, and as such, it limits the ROM address space to 64K. This memory space of 64K has been an adequate ROM address space when performing emulation execution. Typically, a MMP will have a finite set of different microinstructions, and the system will typically a finite number of different macroinstructions. Thus, the ROM address spaces necessary to emulate the entire macroinstructions set through microinstruction execution is finite. However, if the ROM address space is inadequate, then the microprogrammable microprocessor system is limited to a 16 bit address bus and cannot easily provide for an additional microinstruction address space.

Modern microprogrammable microprocessor systems typically operate on a dual non-overlapping two phase clock system where two clock signals are non-variable with a particular frequency. As such, the real memory and ROM must present data when requested and store data when requested in a finite period of time. This non-variable cycle time of the microprogrammable microprocessor system limits the designers ability to select various memory technologies connected to the ISUB or to the processor memory bus.

Memory Address Space

Typically, a MMP will have a processor memory bus of a finite size, e.g. the NCR 32000 has 32 bits. Consequently, the real memory address space is limited to a 32 bit address space. To gain access to bulk storage devices the typical microprogrammable microprocessor systems will have virtual addressing capabilities, e.g. NCR 32000 ATC chip. When accessing bulk storage devices through virtual addressing, segment registers which point to page tables in real memory are maintained so as to provide an extended address space and to provide a storage location from which the actual bulk storage memory addresses can be identified. Problems of these computer systems is the finite real memory space, limitations on direct access, the maintenance of segment registers and page tables for virtual addressing and the memory access time required to obtain information from the page table.

Procedural Switching

Modern computer systems typically use stacks which are a series of registers generally addressable in that can be "pushed and popped" to perform procedural level switching, that is, procedural calls and returns. When switching between procedural levels within a given context, that is, procedural calls and returns of a given process, the computer system will typically have to pass arguments and parameters between the procedural levels and secondly store status and parameters of the current procedural level so that upon completion of the subsequent procedure, a return to the interrupted procedural level can be effectuated. This storing and passing of arguments and parameters between procedural levels requires the writing and reading of various registers and requires storing of status and parameter information. This writing and reading is accomplished by the execution of various overhead instructions, which execution limits the performance of the computer system.

Additionally, when context switching, that is, program switch among various concurrently executing processes, the microprogrammable microprocessors system will be required to store status, arguments and parameters of the interrupted process so as to be able to effectively restore its condition upon conclusion of an interrupting process. For example, a stack associated with a given process which stack stores argument and parameter data of various procedural levels, must be saved so as to effectuate a subsequent restore. This data would also be read upon restore. This reading and saving is accomplished by overhead instruction execution. The overhead instruction execution associated with procedural level switching and context switching degrades the performance of the microprogrammable microprocessor systems.

Memory Cache

One of the high cost elements of the modern microprogrammable microprocessor system is the real memory. This semiconductor real memory is expensive but is typically a high performance technology in terms of speed. Those skilled in the art can appreciate hierarchical memory systems including ROM for microinstruction store, least recently used (LRU) memory cache for high speed macroinstruction-data fetches, medium speed real memory comprising semiconductor memory, and bulk storage on disks and tapes devices. The LRU cache memory is an extremely high speed memory area in which the microprocessor reads and writes information. Because of the cyclic and sequential nature of program execution, it has been found that such LRU caches in combination with real memory and bulk storage provide a cost-benefit solution to the varying costs of memory components.

One of the problem with the LRU cache, real memory and bulk storage memory architecture is the necessity to maintain an LRU cache which typically will have 16 pages, e.g. NCR 32000 ATC. When an instruction is requested that is not found in the LRU cache or real memory, a page fault exists. This page fault will require the execution of overhead instructions to retrieve the missing page of data from bulk storage and to load it into the LRU cache or real memory for high speed execution. Though this may typically be done through direct memory access (DMA), there still is a degrading effect of the overhead instruction execution required to bring this missing page of data into the LRU cache memory or real memory.

Another problem with this LRU cache, real memory, bulk storage architecture is the limited number of entries in the LRU cache, that is, the number of pages in an LRU cache or real memory, e.g. 16 for NCR 32000 ATC. A typical microprogrammable microprocessor system will include an address translation chip (ATC) which ATC is used to determine if the presently requested instruction is located in the LRU cache or real memory. With a small number of page entries, the probability of a miss in the LRU cache, that is, a page fault, is likely to occur requiring the execution of excessive overhead page loading instructions so as to load into the LRU cache the page in which the missed instruction is located. This overhead execution limits the performance of a microprogrammable microprocessor system.

Reduced Instruction Set

The microprogrammable microprocessor system typically will have at least two different sets of instructions. One being a microinstruction set stored in ROM and the other one being a macroinstruction set stored in RAM. Consequently, programing activity is expanded and directed to two separated memories that is, the microinstruction programs stored in ROM and the macroinstruction programs stored in RAM.

Some computer designers have found that because of the recent reduction in memory costs, in that more memory is now available for the same cost, the macro-/microinstruction architecture is no longer as necessary. A single set of instructions in one memory can now be used cost effectively. These instructions are primitive type instructions. They are simple instructions which can be executed quickly. It has been found that by increasing the speed of a microprocessor with increased real memory space, a primitive instruction set, that is, a simple reduced instruction set provides overall increased system performance.

A problem with a microprogrammable microprocessor system is the limited ROM space. When executing only primitive instructions, the actual memory requirement for a given program will increase in comparison to the memory space of a emulatory MMP using ROM and RAM. Hence, executing a reduced instruction set by a MMP is impractical because of the limited address space on ISUB.

Another problem of modern microprogrammable microprocessor systems is the limitation of the MMP instruction set, in that, the manufacturers of the MMP provide a microinstruction set that is to be used for a particular system architecture. This limitation on system programmers limits the flexibility of the microprogrammable microprocessor systems that use the MMP which is embedded in VLSI semiconductor technology and are non-alterable to the users.

A Description of a Prior Art System

Referring to FIG. 1, which is a diagram depicting an architecture of a microprogrammable microprocessor system, microinstructions are stored in ROM referred to as an instruction storage unit 10. A Central Processor Chip (CPC) which is a microprogrammable microprocessor, e.g. NCR 32000, 12 executes microinstructions in the instruction storage unit 10. Macroinstructions are stored in real memory 14 which may be considered a single large memory cache similar to a single large LRU cache.

Operation of the system is controlled by control logic 16. Real memory 14 is accessed by the CPC 12 with the aid of an address translation chip (ATC) 18 which operates as a virtual address translation mechanism for virtual address translation and page fault determination of real memory 14.

An extended arithmetic chip (EAC) 20 is used for performing extended arithmetic operations. Input-output is provided by a serial interface chip 22 which is connected to a serial interface transmitter 24 and a serial interface receiver 26 over a serial transmitting line 28 and a serial interface receiving line 30, respectively. The serial interface transmitter 24 and serial interface receiver 26 connect to I/O channel lines 32a and 32b, respectively, to an I/O device 34. The I/O device 34 is a bulk storage device or another type of input-output device such as a video terminal or a keyboard.

The CPC 12 is connected to the instruction storage unit 10 through an instruction storage bus 36. A processor memory bus 38 connects the CPC 12 to the real memory 14, address translation chip (ATC) 18, extended arithmetic chip 20 and serial interface chip 22. Real memory 14 comprises a semiconductor RAM memory and stores macroinstruction in RAM.

Macroinstructions stored in real memory 14 are fetched to the CPC 12 over processor memory bus 38. The CPC then executes microinstructions stored, in the instruction storage unit 12 by fetching microinstructions over the instruction storage unit bus 36. After the execution of a sequence of microinstructions so as to emulate the macroinstruction, CPC 12 then fetches another macroinstruction in real memory 14.

In the event of an extended arithmetic operation, the CPC 12 transfers instructions and parameters to the extended arithmetic chip 20 and subsequently polls the extended arithmetic chip 20 to determine the completion of an extended arithmetic operation, at which time the CPC 12 then reads output from the extended arithmetic chip 20 over the processor memory bus 38.

The CPC 12 presents virtual and real addresses onto the processor memory bus 38. If this address is a real address then the real memory 14 is accessed. If this address is a virtual address, then the ATC 18 determines if a page of memory in which this virtual address is located is presently in the real memory 14. A translation from a virtual address to a real address is performed followed by a page fault determination, i.e. is the page presently in real memory 14. If not, a page fault occurs, otherwise, the real address is presented to the real memory 14.

In the event of a real memory miss, i.e. a page fault, the ATC 18 would interrupt the CPC 12 which in turn would provide commands to the serial interface chip 22 to load a new page of memory from the I/O device 34 into real memory 14 so that the CPC 12 can then execute the missing macroinstruction in real memory 14.

The microprogrammable microprocessor system depictured in FIG. 1 suffers from the aforementioned problems which are solved by a direct-execution microprogrammable microprocessor system.

SUMMARY

It is an object of the present invention to improve the efficiency of microprogrammable microprocessor systems. Another object of the present invention to provide direct execution of primitive, reduced and redefined instruction sets in a main memory with simultaneous fetching on both a microinstruction port and a combined macroinstruction and data port and with an extended address space of a main memory mapped into the virtual memory address space of a microprogrammable microprocessor.

It is yet another object of the present invention to improve the speed of context and procedural level switching. Additionally, it is another object of the present invention to provide variable microinstruction cycle time enabling efficient microinstruction fetching from main memory. It is another object of the present invention to improve the virtual memory page hit-miss ratio. Finally, it is object of the present invention to provide overlapped main memory access and virtual address translation.

A direct-execution microprogrammable microprocessor system use a microprogrammable microprocessor for direct execution of microinstructions in main memory, through a microinstruction port serving to communicate microinstructions from the main memory to the microprocessor. Without limiting the generality of the invention, the microprocessor may make use of a microinstruction cache which is interposed between the microprocessor and main memory; virtual accesses to main memory are effected via a system multiplexor. A virtual address extension unit and virtual address bus provide extension and redefinition of the main memory address space of the microprocessor. The system may also use a context switching stack cache and an expanded address translation cache, with the microprocessor having a reduced and redefined microinstruction set with a variable microinstruction cycle.

Direct Execution of Microcode in Main Memory

A microprogrammable microprocessor (MMP) is connected to a microinstruction cache and a microinstruction address extension unit so as to provide a path from the MMP into a main memory. This connection provides direct execution of a microinstruction set by the MMP executing microinstructions stored in the main memory. This microinstruction set is a primitive and reduced instruction set which is a subset of the microinstruction set of the MMP with some of the microinstructions redefined. The use of a reduced instruction set as executed by the microprogrammable microprocessor improves the speed of the direct-execution microprogrammable microprocessor system.

The MMP also is connected to the main memory-through a processor memory bus. This bus is used for data fetching while an instruction storage unit bus is used for microinstruction fetching. Programmers can now program at the macroinstruction level providing macroinstruction code which is compiled to a primitive and reduced instruction set prior to run time so that overhead execution during macroinstruction emulation is no longer required at execution time.

The MMP is also connected to various registers distributed throughout the direct-execution microprogrammable microprocessor system through a register bus thereby providing a three bus system which enable simultaneous data transfers over these buses.

Virtual Address Extension

A virtual address extension unit is used to extend a main memory address space. This extension provides for context switching so as to eliminate overhead instruction execution associated with context switching. The virtual address extension comprise an eight-bit context indentifier so that when appended to a 32 bit virtual address, the address space is expanded to 40 bit with a context identifier thereby increasing the context switching speed.

The main memory which stores microinstructions and data is entirely mapped to the virtual memory address space with I/O operations mapped to the real memory space. This provides for simple system operation and system architecture.

The microinstruction cache operates to provide the MMP with microinstructions at a fast instruction execution rate. However, in the event of a microinstruction cache miss, the instruction execution rate is varied so as to provide time for a microinstruction access into main memory which access reads the missed microinstruction from main memory followed by a write into the microinstruction cache thereby making the microinstruction available to the MMP without the need to interrupt the MMP. The MMP does not have to execute overhead instructions or re-execute the microinstruction fetch operation because the variable instruction execution rate provides time in which to provide the MMP with the missed microinstruction.

Context Switching Stack Cache

A context switching stack cache is connected to the MMP which stack cache provides for fast context switching and procedural level switching through bank and frame selects which selects are effected by simple register write operations to the context switching stack cache. This provides for increased speed in context and procedural level switching.

The microinstruction cache with the microinstruction address extension unit, and the context switching stack cache combine to provide for improved speed performance thereby reducing the need for a large instruction-data cache.

Expanded Address Translation Cache

The main memory is connected to an expanded address translation cache (EATC) which is organized in 1K words by 4 banks. The EATC translates virtual address into main memory address with the number of pages expanded to 4K. This increase of pages to 4K improves the virtual address hit-miss ratio for pages in main memory. The EATC is managed by software. This EATC provides for memory hit-miss determination while providing simultaneous overlapped accessing to main memory. These and other advantages will become more apparent in the following description of a preferred embodiment.

DRAWING DESCRIPTIONS

Figure 5:
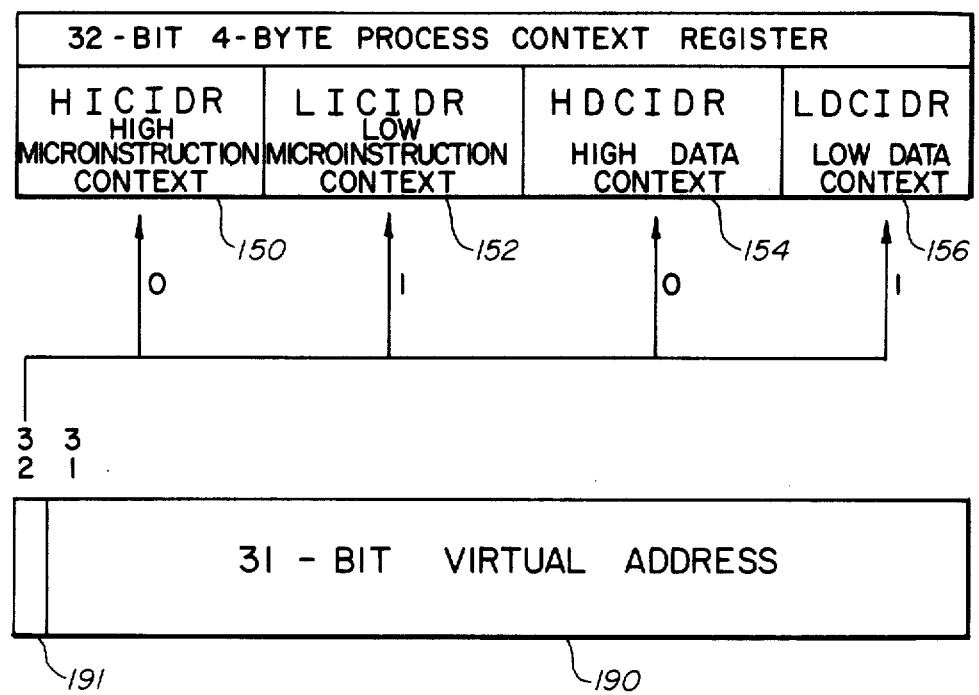

FIG. 5 depictures process context registers and a 32 bit virtual address word.

Figure 6:
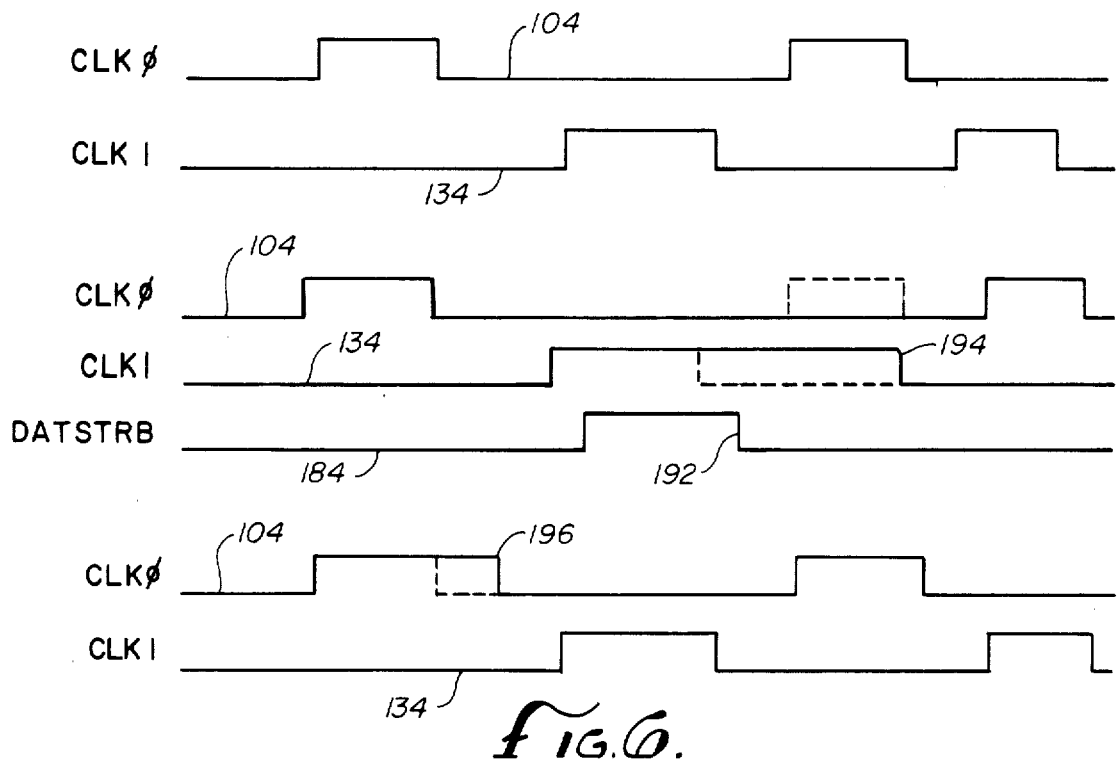

FIG. 6 is a timing diagram of clock cycles of the direct-execution microprogrammable microprocessor system.

Figure 7:
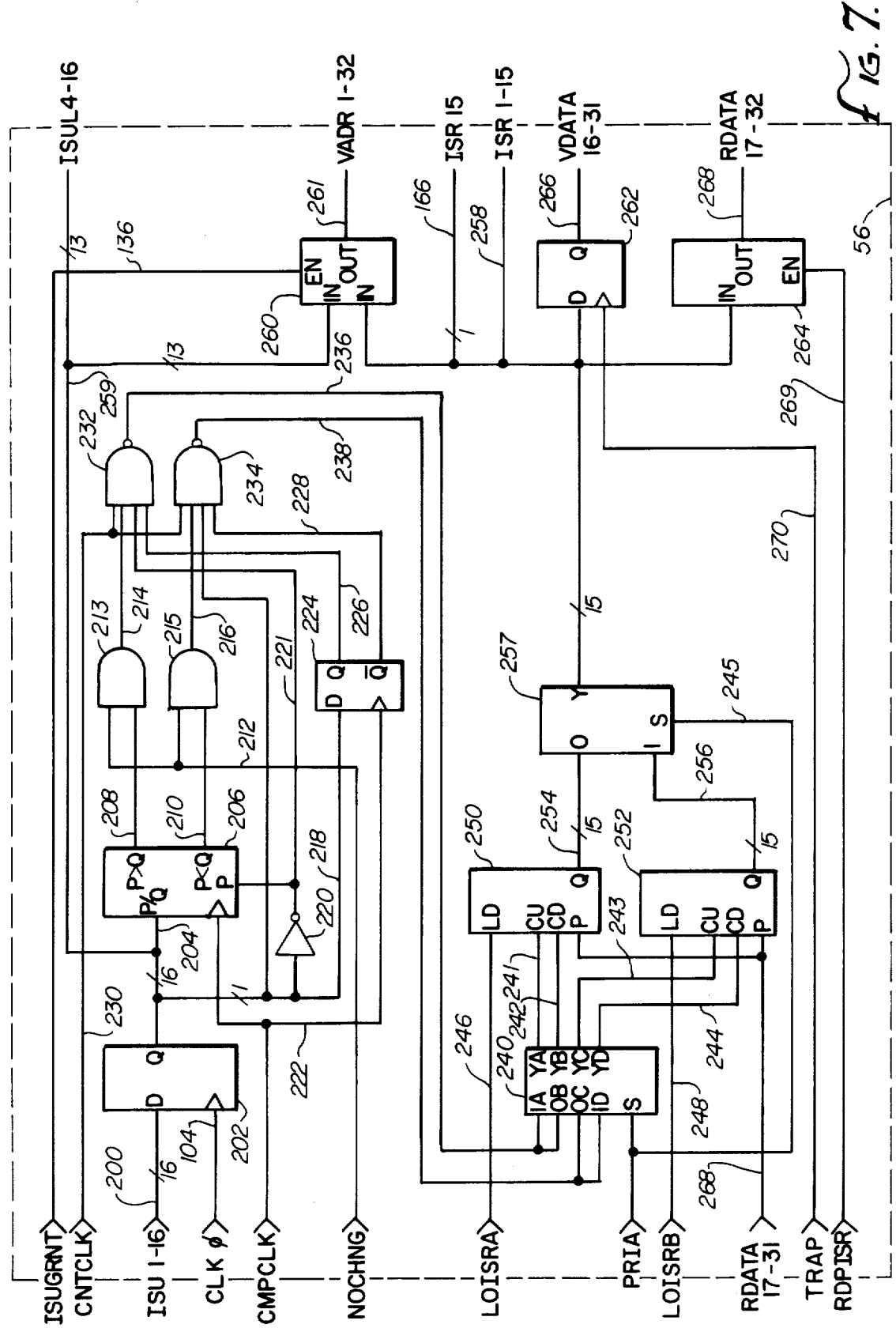

FIG. 7 is a schematic of a microinstruction address extension unit.

Figure 8:
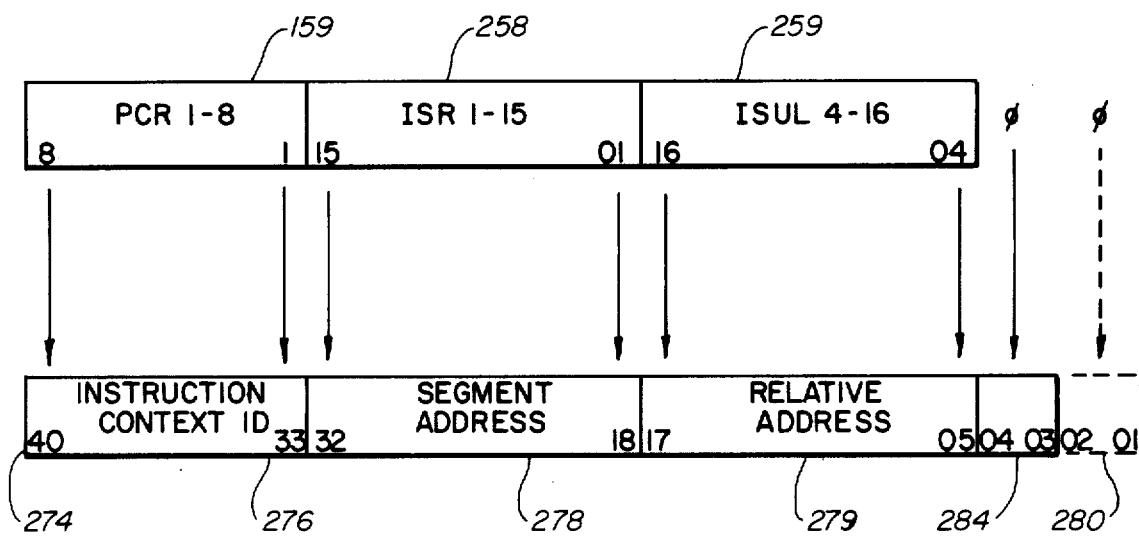

FIG. 8 depictures the address formulation which occurs in the microinstruction address extension unit.

Figure 9:
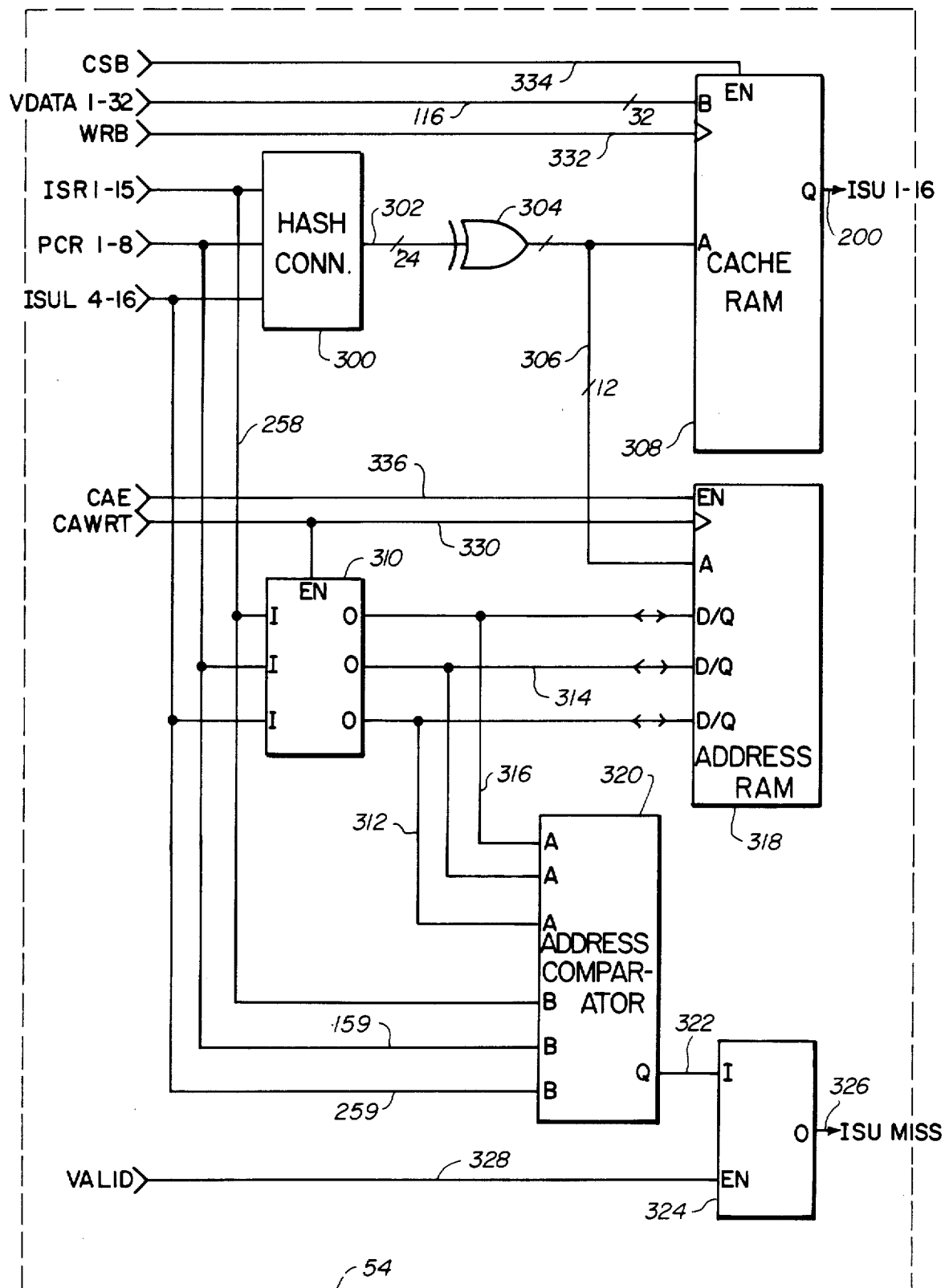

FIG. 9 is a schematic of a microinstruction cache.

Figure 10:
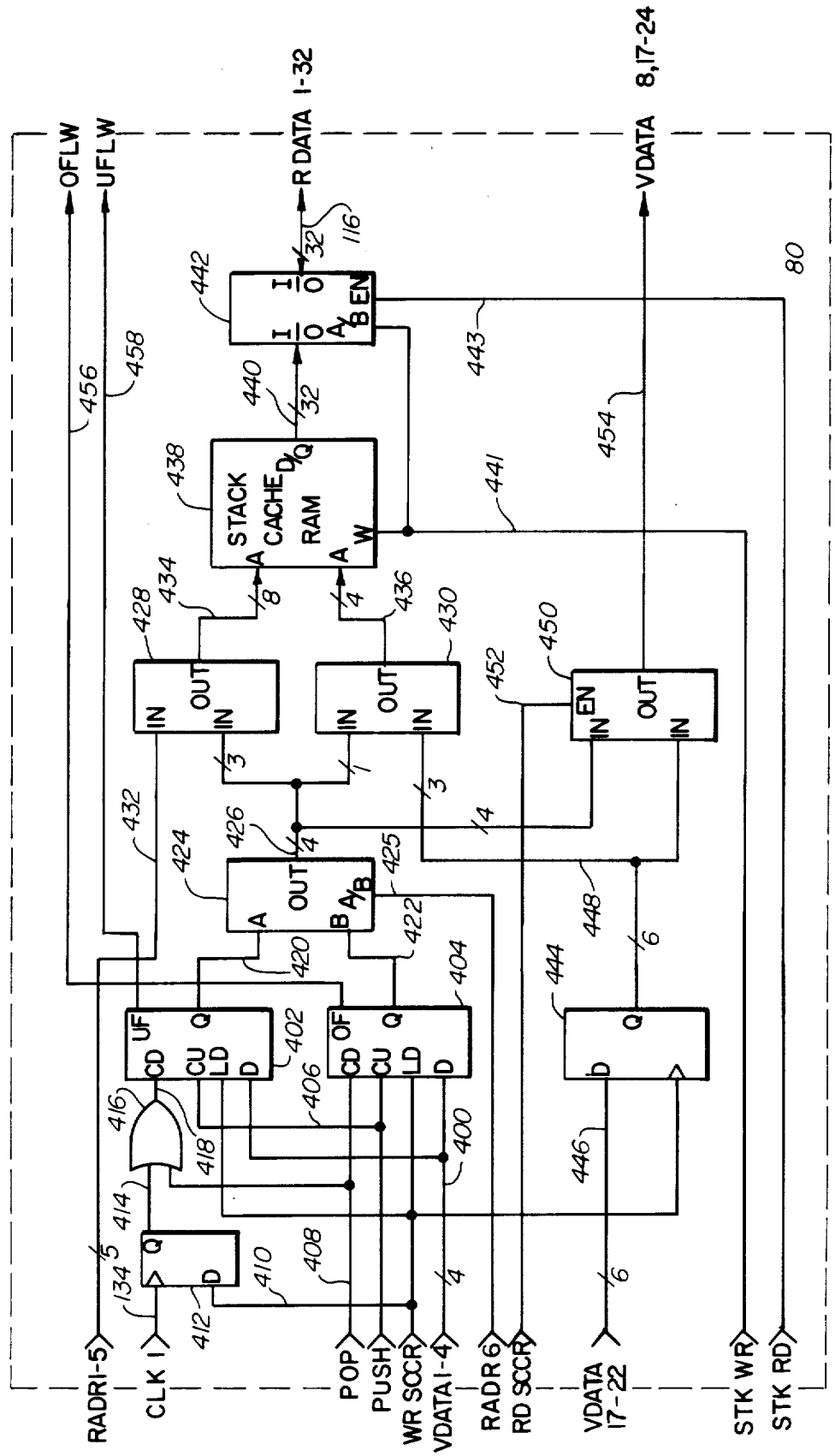

FIG. 10 is a schematic of a context switching stack cache.

Figure 11:
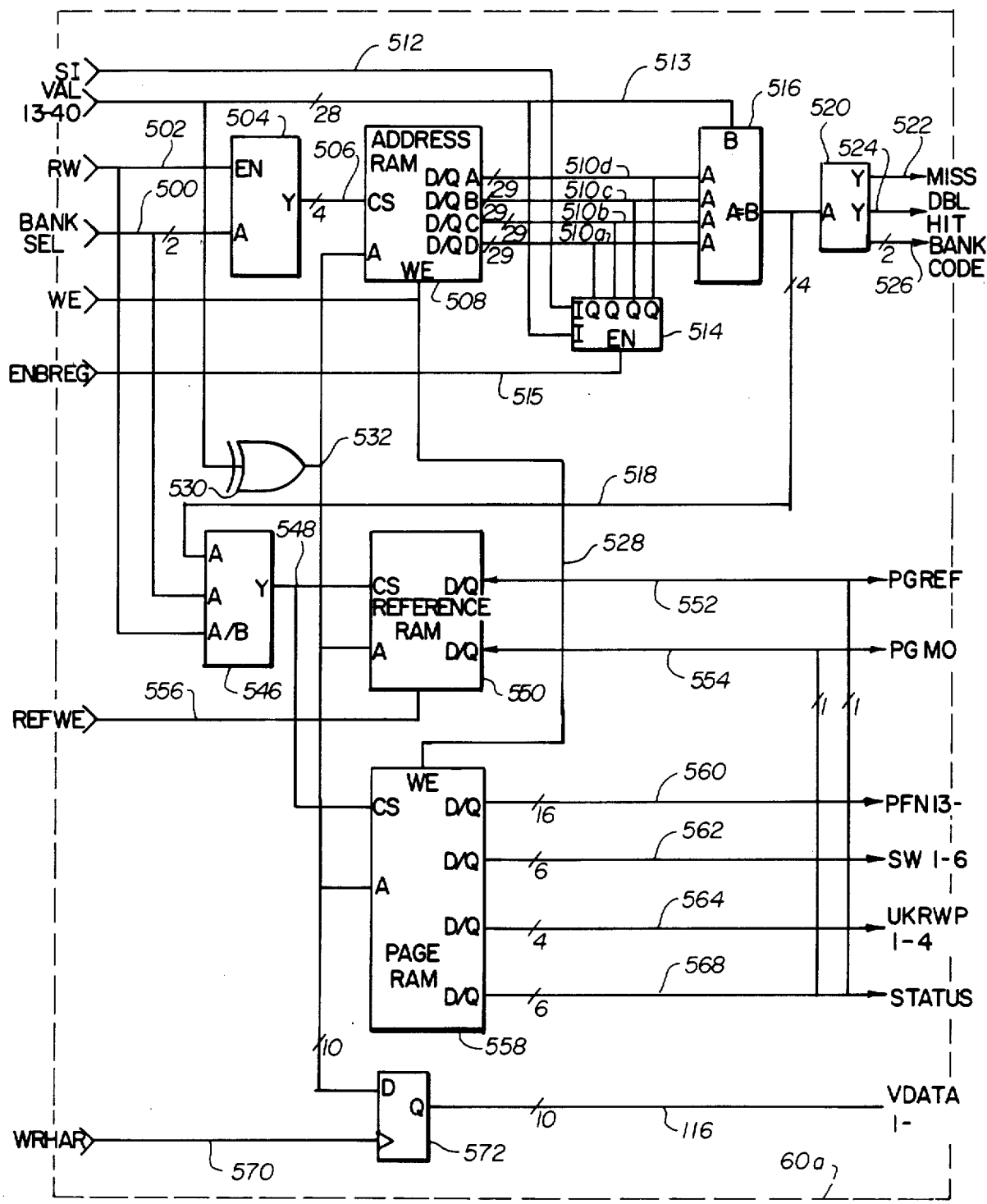

FIG. 11 is a schematic of an expanded address translation cache.

Figure 12:
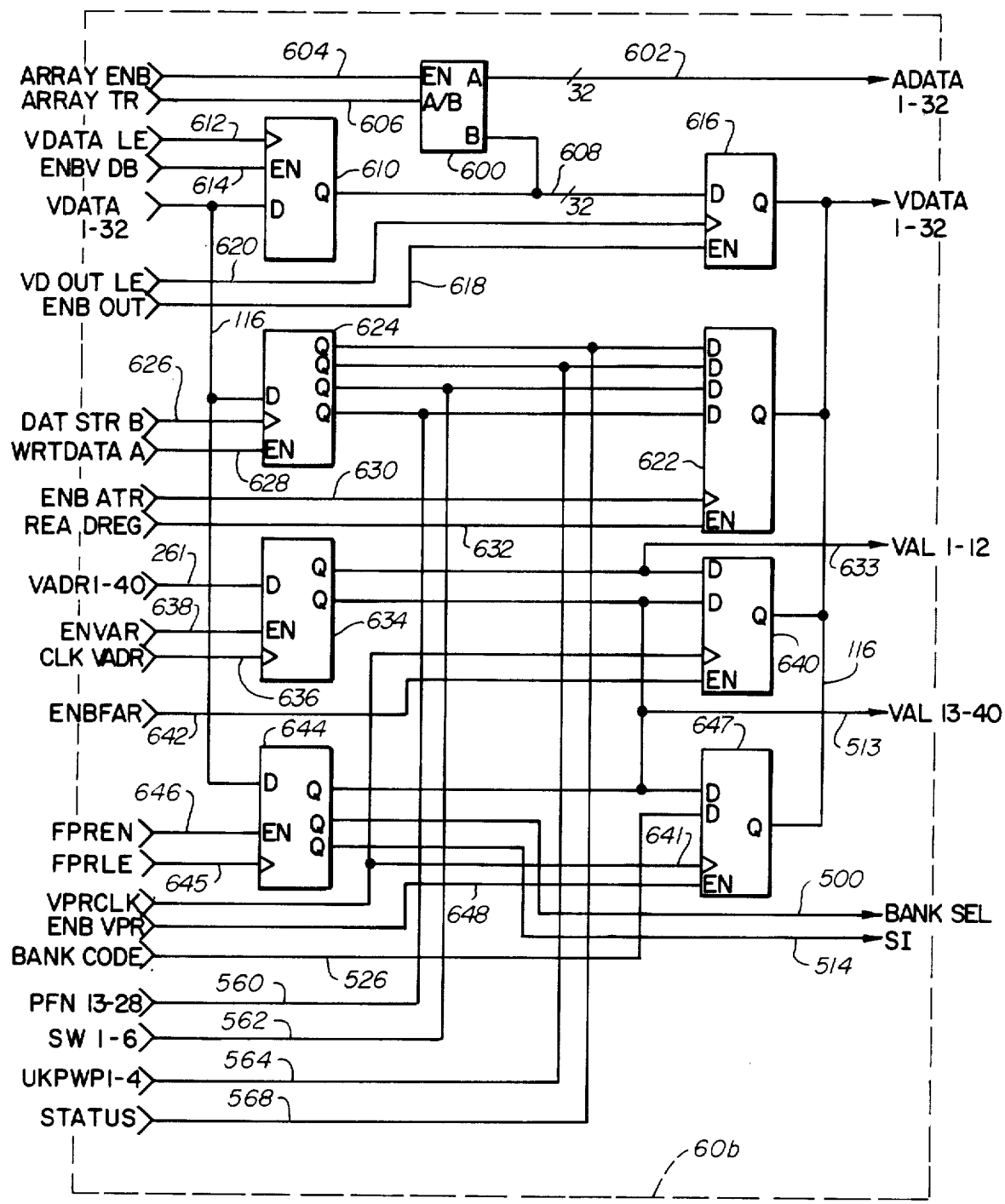

FIG. 12 is a schematic of read and write registers of the expanded address translation cache.

Figure 13:
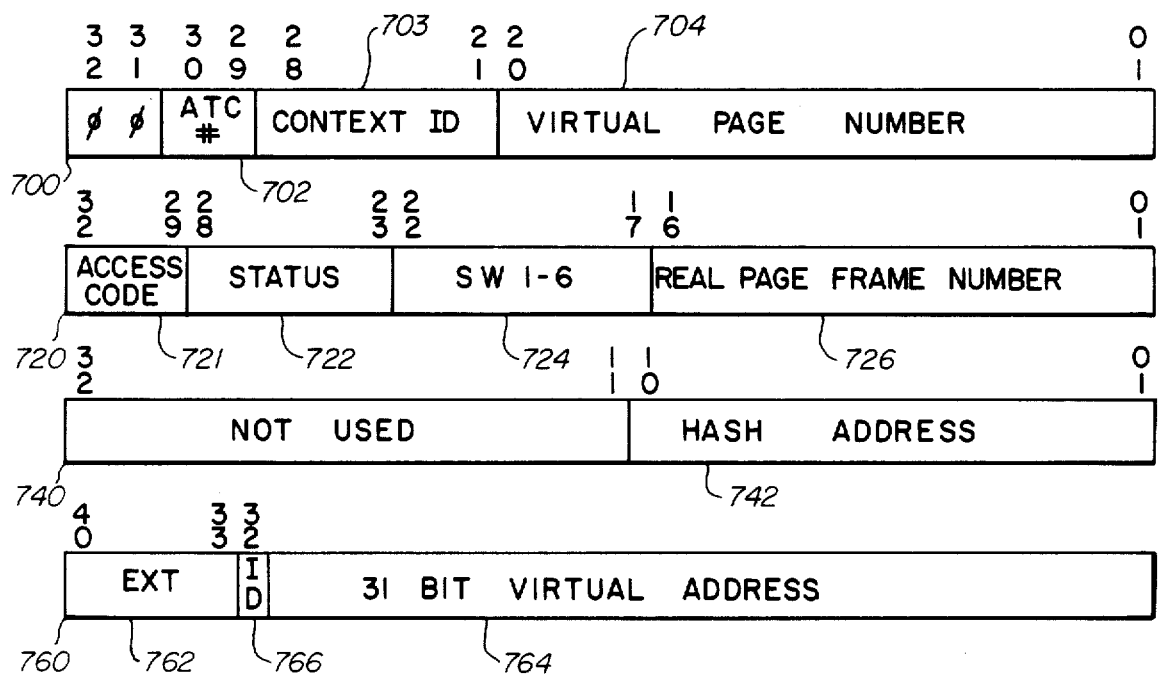

FIG. 13 depictures various system data structures.

FIG. 14 is a block diagram of control logic.

PREFERRED EMBODIMENT

Figure 1:
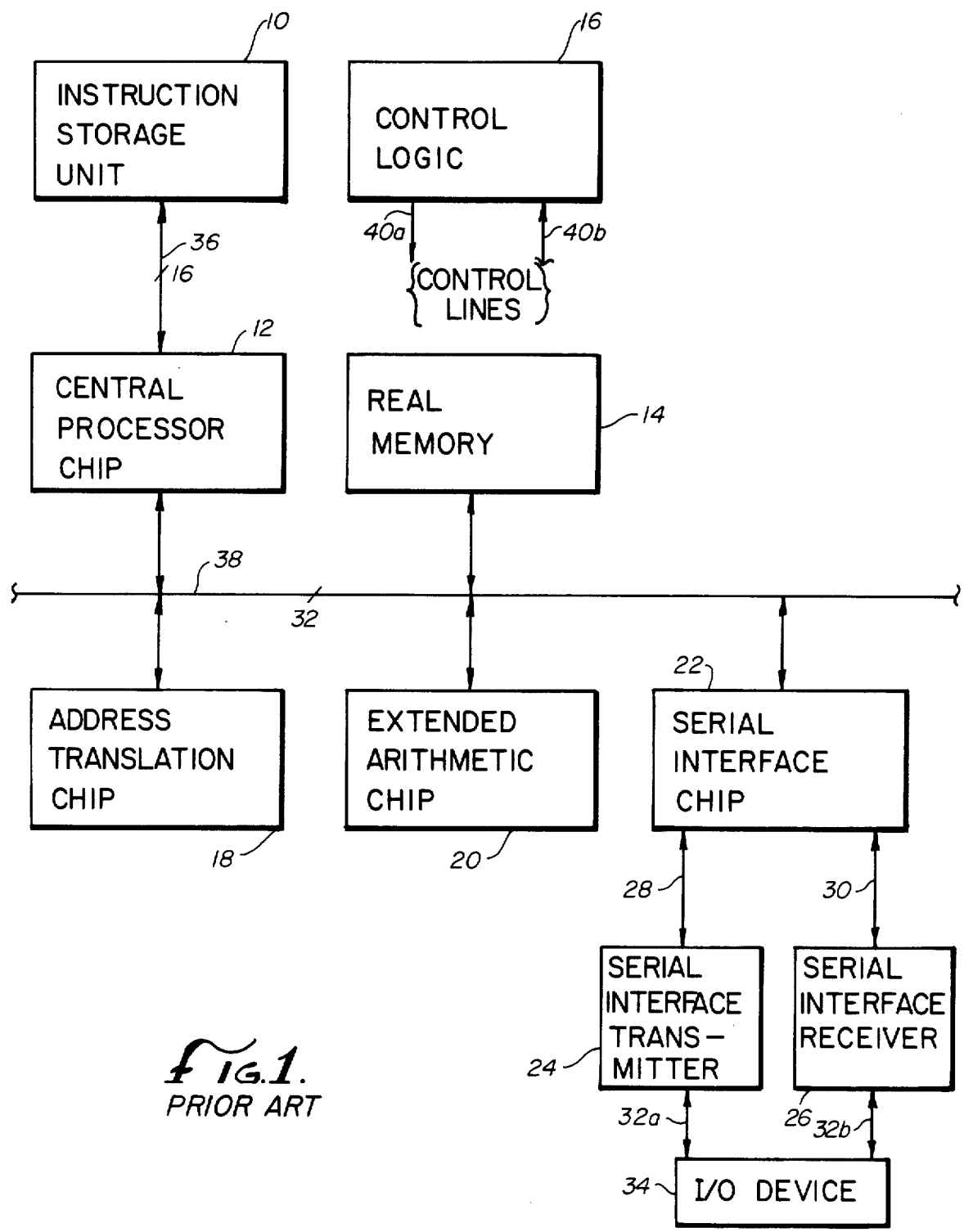
FIG. 1 is a block diagram of a prior art microprogrammable microprocessor system.
Figure 2:
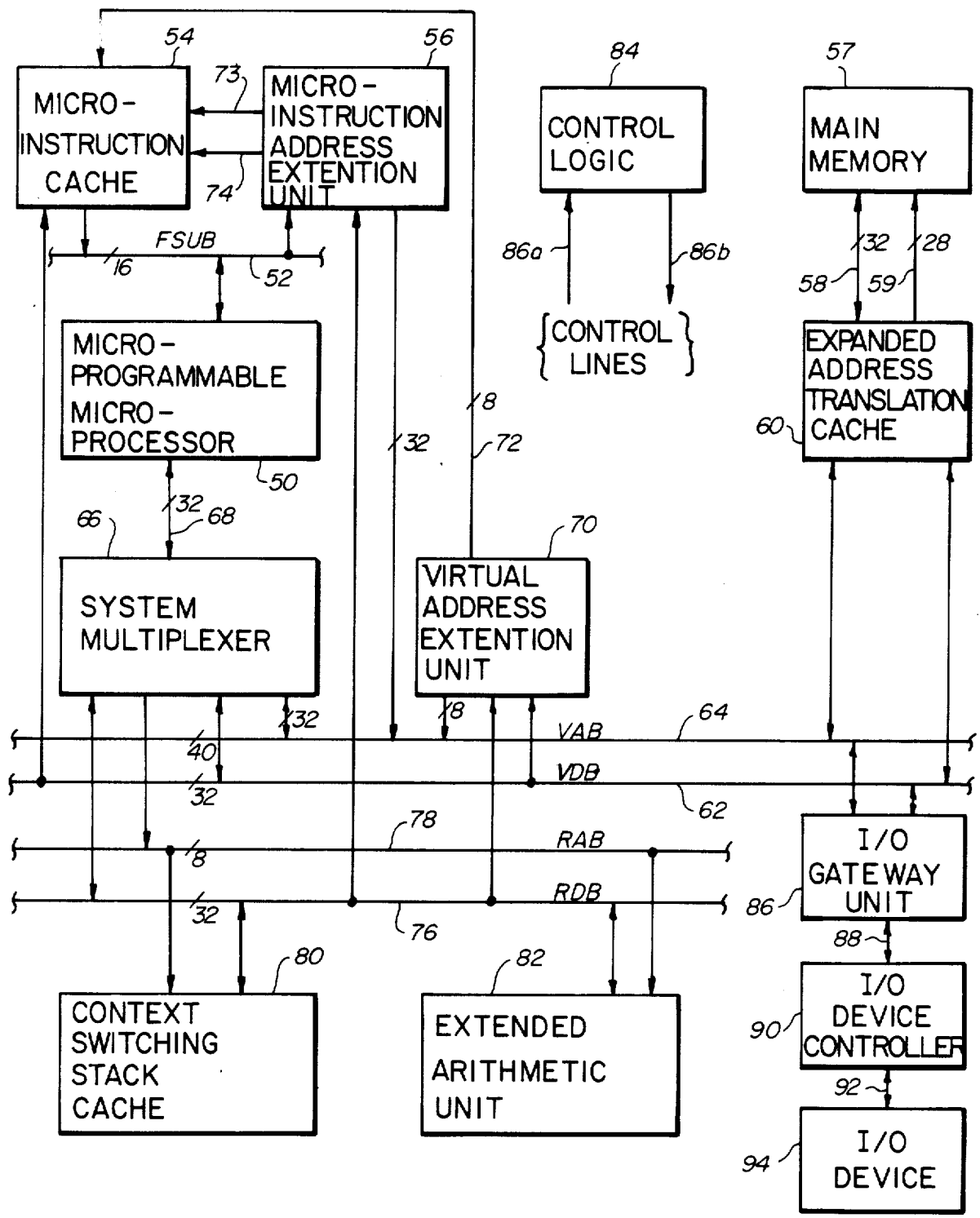
FIG. 2 is a block diagram of a direct-execution microprogrammable microprocessor system.

Referring to FIG. 2 which depictures a direct-execution microprogrammable microprocessor system, a microprogrammable microprocessor (MMP) 50, e.g. NCR 32000, is connected through an instruction storage unit bus 52 to a microinstruction cache 54 and to a microinstruction address extension unit 56. The microinstruction cache 54 and the microinstruction address extension unit 56 provide a means through which the MMP 50 can directly execute primitive microinstructions stored in a main memory 57 to which is connected main memory data lines 58 and main memory address lines 59 for accessing the main memory 57.

An expanded address translation cache 60 is connected to the main memory 57 through the main memory data lines 58 and main memory address lines 59.

The direct-execution microprogrammable microprocessor system has a virtual data bus 62 and a virtual address bus 64 for accessing main memory 57. Addresses presented on the virtual address bus 64 are sensed by the expanded address translation cache 60 for firstly determining if the addressed memory location is in main memory 57 and secondly to provide addresses for the main memory 57.

A system multiplexer 66 is connected to the MMP 50 through a processor memory bus 68. The MMP 50 typically accesses main memory 57 during data reads and writes through the system multiplexer 66, through the processor memory bus 68 and through the virtual address bus 64 in combination with the virtual data bus 62.

The MMP 50 fetches microinstructions from the microinstruction cache 54. A virtual address extension unit 70 presents a virtual address extension on process context register lines 72 while the microinstruction address extension unit 56 provides a segment address on instruction segment register lines 73 and provides a relative address on instruction storage unit lines 74. Address lines 72, 73 and 74 address the microinstruction cache 54 which presents microinstructions on the instruction storage unit bus 52.

When the MMP 50 presents a relative address on the instruction storage unit bus 52 and the microinstruction is not presently stored in the microinstruction cache 54, a microinstruction cache miss condition occurs. This miss condition will cause the microinstruction address extension unit 56 to present a virtual address on the virtual address bus 64. In the event of this microinstruction cache miss, four microinstruction words are fetched from main memory 57.

During a main memory microinstruction fetch operation, the MMP 50 provides a 16 bit relative address with the microinstruction address extension unit 56 providing a segment address. The microinstruction address extension unit 56 presents a 32 bit virtual address onto the virtual address bus 64 while the virtual address extension unit 70 provides an 8 bit virtual address extension onto the virtual address bus 64.

A 40 bit virtual address is then recognized by the expanded address translation cache 60 for main memory accesses resulting in four microinstruction words written to the microinstruction cache 54 for execution by the MMP 50.

The system multiplexer 66 is also connected to a register data bus 76 and a register address bus 78. These register buses 76 and 78 are connected to registers (not shown) throughout the direct-execution microprogrammable microprocessor system. The register address bus 78 and register data bus 76 are used to transfer register control and data information to and from these registers for fast read and write operations.

A Context switching stack cache 80 is used for context and procedural level switching. An extended arithmetic unit 82 is used for extended arithmetric operations.

Control logic 84 provides control signals throughout the direct-execution microprogrammable microprocessor system for controlling the operations of the system. Control logic 84 controls the operation through control lines 86a and 86b. Though represented here for simplicity, control lines 86a and 86b comprise a plurality of control lines (not shown).

For data communication to bulk storage devices, the virtual address and data buses 62 and 64 are connected to an I/O gateway unit 86 which is connected to a multibus 88, e.g. IEEE 796 bus, which in turn is connected to an input-output device controller 90, which in turn is connected to an input-output channel 92, which in turn is connected to an input-output bulk storage device 94.

Main memory 57 is mapped to the virtual memory address space of the MMP 50. Instruction fetches occur from the MMP 50 through the microinstruction cache 54 to the main memory 57, whereas, data reads and writes occur through the system multiplexer 66 using the processor memory bus 68, the virtual address bus 64 and the virtual data bus 62. Hence, main memory 57 is accessed through virtual reads and writes.

The I/O gateway unit 86 is mapped to the real memory address space of the MMP 50. One skilled in the art would appreciate the decode activity that is performed in determining if the MMP 50 is doing a real memory access, upon which determination the I/O gateway unit 86 would then sense the virtual address bus 64 and virtual data bus 62 to receive data from the MMP 50.

Register data bus 76 carries data to the virtual address extension unit 70 and the microinstruction address extension unit 56 for changing process context registers (not shown) and segment registers (not shown), respectively.

The busses 76 and 78 also connect to a context switching stack cache 80 which includes memory arrays (not shown) for fast context switching and procedural switching of various processes concurrently executed in the system.

The system multiplexer 66 which is connected to the MMP 50 through the processor memory bus 68, is connected to the virtual address bus 64, virtual data bus 62, register address bus 78 and register data bus 76 so as to multiplex data among these buses. By the use of the instruction storage unit bus 52 for accessing the microinstruction cache 54 and for main memory 57 instruction fetches, and by using the system multiplexer for accessing subsystems 80, 82, 60 and 88 and main memory 57, simultaneous transfers occur in the system, that is, a microinstruction fetch operation may occur while the main memory 57 is presenting information to the system multiplexer 66 or the I/O gateway unit 86. In this manner, the system provides simultaneous and concurrent data operations thereby improving the speed of the system.

For a further understanding of the MMP 50 see publications "NCR/32 General Information" VLSI Processor Products, NCR Microelectronic Division, NCR Corporation, Colorado Springs, Colo., Copyright, 1983, NCR Corporation, Dayton, Ohio; and "NCR/32-000 32-bit Microprogrammable Microprocessor", NCR Microelectronic Division, NCR Corporation, Colorado Springs, Colo., Copyright, 1983, NCR Corporation, Dayton, Ohio.

For further understanding of the operation of the direct-execution microprogrammable microprocessor system, see in combination co-pending applications: Virtual Address Extension Unit, Ser. No. 710,277; Context Switching Stack Cache, Ser. No. 710,278; and Microinstruction Address Extension Unit and Method, Ser. No. 710,323, all of which are incorporated herein by reference as there fully set forth.

It should be understood that the following descriptions do not include such things as simple inversions, parity checks and simple boolean logic since one skilled in the art would appreciate these mechanisms and know how to build and implement these mechanisms in a direct-execution microprogrammable microprocessor system.

System Multiplexer

Figure 3:
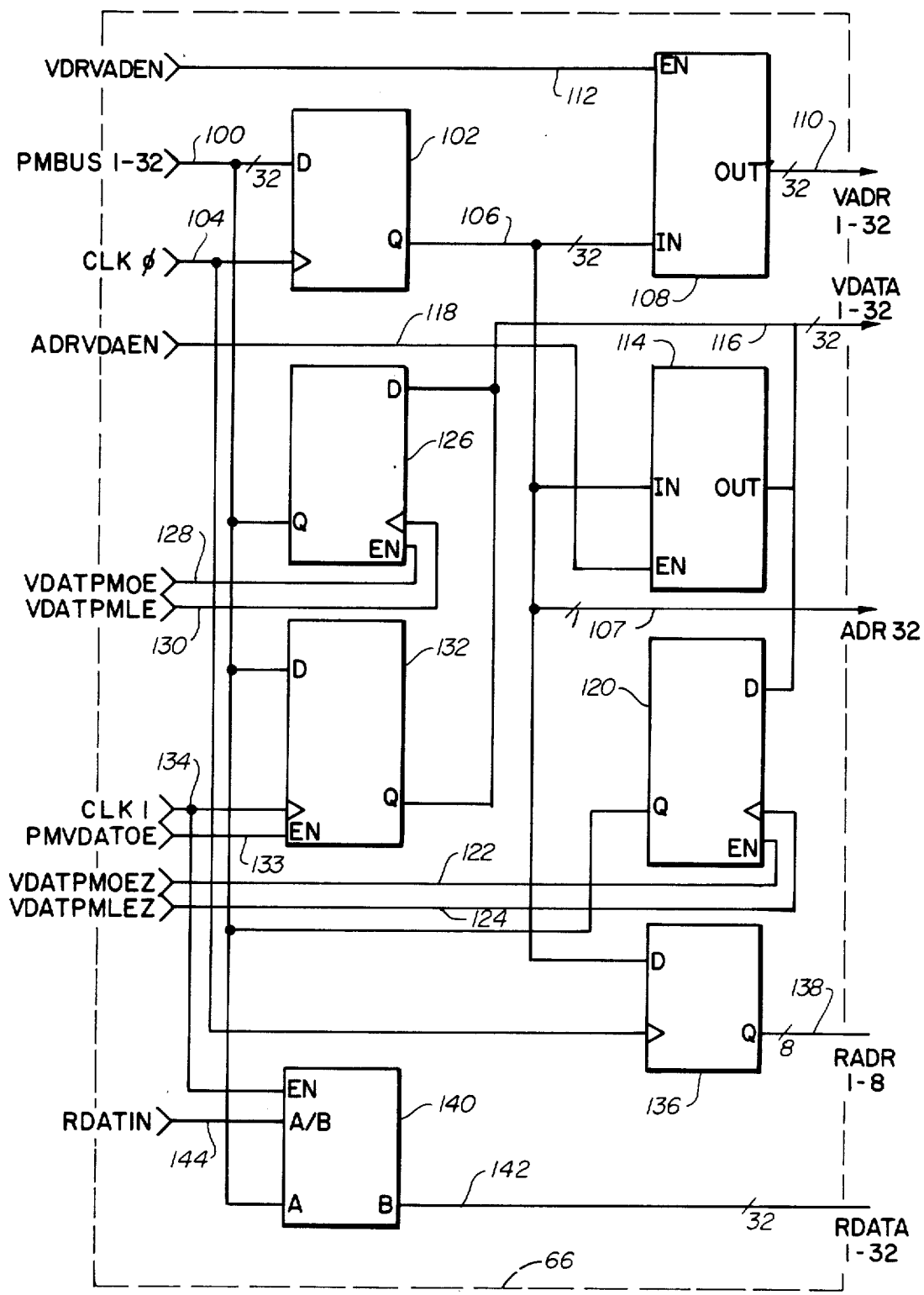
FIG. 3 is a schematic of a system multiplexer.

Referring to FIGS. 2 & 3, the processor memory bus 68 comprises address and data bits on PM bus 1-32 lines 100 connecting the MMP 50 to the system multiplexer 66. When the MMP 50 presents addresses on PM bus 1-32 lines 100, a processor memory bus latch 102 stores the address upon receiving an active clock zero signal on clock zero line 104. The output of this processor memory bus latch 102 is presented on address bus 1-32 lines 106. The high order bit of this address is also presented on address 32 line 107 which is used for context switching.

The address bus lines 106 are connected to a virtual address source driver 108 which presents outputs on virtual address 1-32 lines 110. These virtual address 1-32 lines 110 are part of the virtual address bus 64. Addresses are presented on the virtual address bus 64 from the processor memory bus 68 by the use of the processor memory bus latch 102 and the virtual address source driver 108. An address to virtual address enable line 112 is connected to the virtual address source driver 108 for enabling the address on the address 1-32 lines 106 onto the virtual 1-32 lines 110.

In the instance where the PM bus 1-32 lines 100 are providing data from the MMP 50, the address bus 1-32 lines 106 present that data to a literal address driver 114. This data is then presented on virtual data 1-32 lines 116. An address to virtual data enable line 118 is connected to the literal address driver 114 to enable the data on address 1-32 lines 106 onto the virtual data 1-32 lines 116. By the use of this literal address driver 114, data stored in processor memory bus latch 102 can be presented onto the virtual data 1-32 lines 116.

A memory word latch 120 is connected to the virtual data 1-32 lines 116 for reading data presented on the virtual data 132 lines 116. A virtual data to PM output enable two line 122 is used to enable the data stored in the memory word latch 120 onto the PM bus 1-32 lines 100. A virtual data to PM latch enable two line 124 is used to clock the data on the virtual data 1-32 lines 116 into the memory word latch 120.

Similarly, a virtual data receive latch 126 is used to store data on virtual data 1-32 lines 116 and present that data onto the PM bus 1-32 lines 100. A virtual data to PM output enable line 128 is used to present this data onto the PM bus 1-32 lines 100. A virtual data to PM latch enable line 130 is used to clock data on the virtual data 1-32 lines 116 into the virtual data receive latch 126.

It should be understood that a set of privileged registers (not shown) correspond to scratchpad memory registers as defined by the MMP 50, e.g. NCR 32000. One of the purposes of the use of the virtual data 1-32 lines 116 is to provide data to these privileged registers. These privileged registers (not shown) are read from and written to within one memory instruction cycle and provide for fast system control as later discussed.

The virtual data receive latch 126 acts as a primary register and the memory word latch 120 acts as a secondary register. During single word fetches the virtual data receive latch 126 is predominantly used to transfer data from main memory 57 to the MMP 50.

In the event of a double word fetch from main memory 57, the virtual data receive latch 126 and the memory word latch 120 combine to form a 64 bit data register.

A virtual data source latch 132 is used to store data on the PM bus 1-32 lines 100 and present this data onto the virtual data 1-32 lines 116. This data is clocked into the virtual data source latch 132 on the occurrence of a clock one signal on a clock one line 134. The data stored in the virtual data source latch 132 is enabled onto the virtual data 1-32 lines 116 upon the occurrence of an active signal on the PM to virtual data output enable line 133.

The MMP 50 can write and read data into and from registers (not shown) connected to the register data bus 76 and the register address bus 78.

A register address latch 136 is used to present an address on address lines 106 onto the register address 1-8 lines 138. This address is clocked into the register address latch 138 upon an active signal on the clock zero line 104.

A register data transceiver 140 is used for bi-directional transmission of data between register data 1-32 lines 142 and the PM bus 1-32 lines 100. This bi-direction transmission is controlled by an active signal on a register data in line 144 and the outputs are enabled upon an active signal on the clock one line 134.

It should be understood that the register address 1-8 lines 138 are part of the register address bus 78; the register data 1-32 lines 142 are part of the register data bus 76; virtual address 1-32 lines 110 are part of the virtual address bus 64; and, virtual data 1-32 lines 116 are part of the virtual data bus 62.

The system multiplexer 66 is used to transfer addresses and data between the MMP 50 and the virtual address bus 64, virtual data bus 62, register address bus 78 and the register data bus 76. The register address bus 78 which comprises the register address 1-8 lines 138 is uni-directional and is sourced from the system multiplexer 66.

The various control lines 104, 118, 122, 124, 128, 130, 133, 134 and 144 that clock and enable the data through the system multiplexer 66 are primarily sourced from the control logic 84 on control lines 86a and 86b as shall be later further discussed.

Hence, the direct-execution microprogrammable microprocessor system comprises a MMP 50 and a plurality of subsystems 54, 56, 57, 60, 66, 70, 80, 82 and 86 connected in a tri-bus configuration comprising the instruction storage unit bus 52, the virtual address and data buses 62 and 64, and register address and data buses 76 and 78. The instruction storage unit bus 52 provides for microinstruction fetches. The virtual address bus 62 and the virtual data bus 64 provide for memory fetches. The register address and data buses 76 and 78 are used for register data transfer.

Virtual Address Extension Unit

Figure 4:
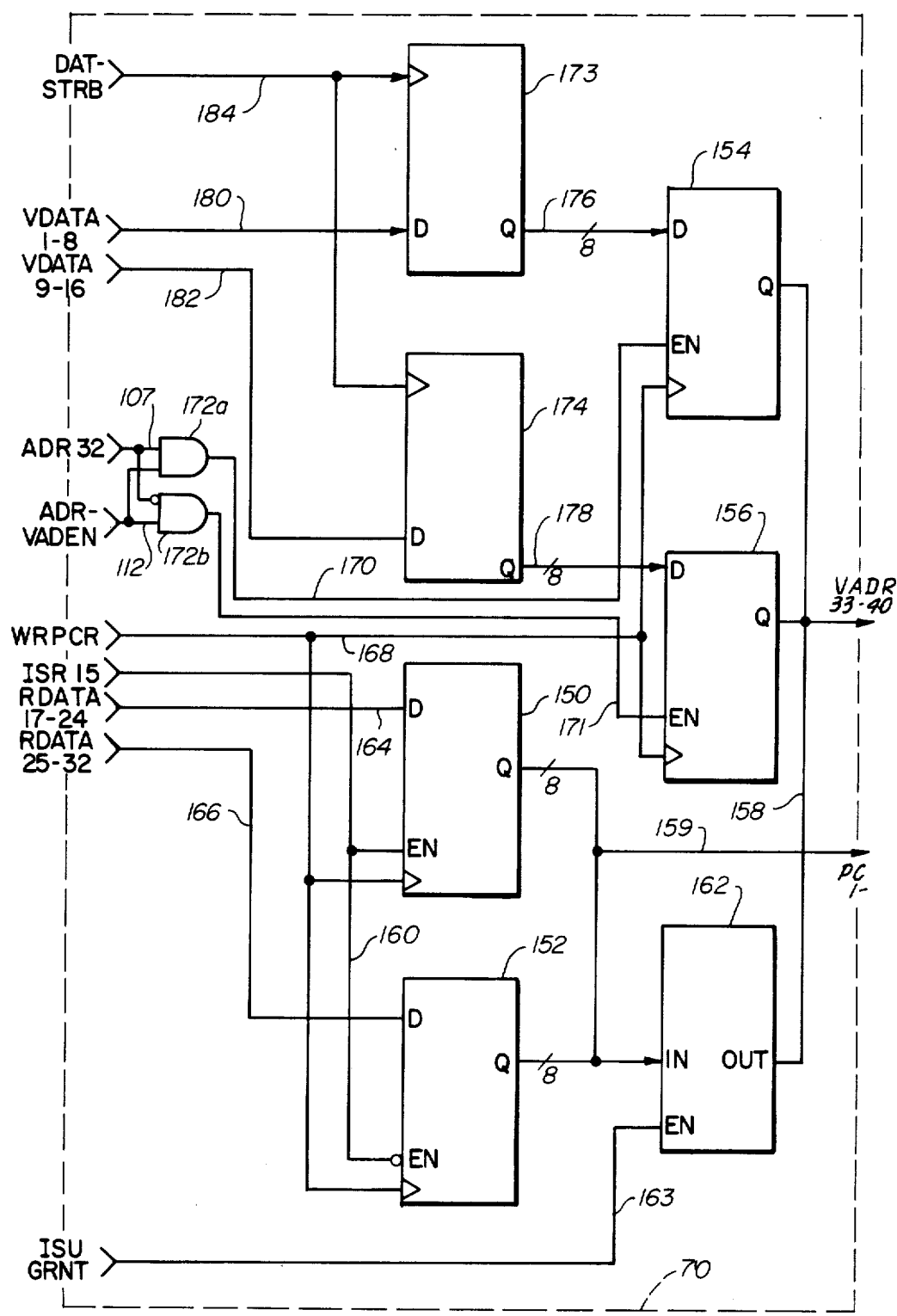
FIG. 4 is a schematic of a virtual address extension unit.

Referring to FIG. 2 and specifically to FIG. 4, a process context register comprises 4 eight-bit registers: a high instruction context register 150; a low instruction context register 152: a high data context ID register 154; and a low data context ID register 156. The outputs of these four registers are multiplexed onto virtual address 33-40 lines 158. During the operation of the direct-execution microprogrammable microprocessor system, one of these bytes is presented onto the virtual address 33-40 lines 158 for process context switching and for main memory virtual address space extension.

During microinstruction fetch operations, an eight-bit process context extension is provided to the microinstruction cache 54 on the process context register 1-8 lines 159 which combine as the process context register lines 72. The selection of either the high instruction context ID register 150 or the low instruction context ID register 152 is determined by a selection signal on an instruction storage register 15 line 160. The extension ID on the process context register 1-8 lines 159 can be presented onto virtual address 33-40 lines 158 by the use of a process context register driver 162 which is enabled by an active signal on an instruction storage unit grant line 163.

Data is presented to the high instruction context ID register 150 and to the low instruction context ID register on register data 17 - 24 lines 164 and on register data 25 - 32 lines 166, respectively.

Data can be written into the process context registers 150, 152, 154 and 156 by an active signal on a right process context register line 168. A pair of enabling lines, enable process context register low line 170 and enable process context register high line 171, are used to present an extension address onto virtual address 33-40 lines 158 by the use of the high data context ID register 154 and the high instruction context ID register 154, respectively. These lines are driven by And gates 172A and 172B, respectively.

A low byte latch 173 and a high byte latch 174 are used to present data onto low byte latch lines 176 and high byte latch lines 178, respectively, to the low data context ID register 154 and high data context ID register 156, respectively. Virtual data 1-8 lines 180 and virtual data lines 9-16 lines 182 present data to low byte latch 173 and high byte latch 174, respectively. This data is clocked into latches 173 and 174 upon an active signal on the data strobe line 184.

Hence, data presented on virtual data lines 1-8 and virtual data 9-16 lines 182 can be presented on virtual address 33-40 lines 158. Data presented on register data 17-24 lines 164 and register data 25-32 lines 166 can be also used to present an address extension onto virtual address 33-40 lines 158.

Address 32 line 107 is combined with the address to virtual address enable line 112 to provide the enabling of the appropriate extension onto the virtual address 33-40 lines 158.

It should now become apparent that the process context register 150, 152, 154 and 156 can be written by data supplied on virtual data lines 180 and 182 and on register data lines 164 and 166.

It should also become apparent that when performing a microinstruction fetch, an instruction storage register 15 line 160 is used to select one of the two registers 150 or 152 are used for a virtual address extension. The high order bit of the address lines 106, that is, address 32 line 107, is used to select one of two registers 154 and 156 which are also used for a virtual address extension.

Hence, it should also be understood that a pair of address extensions bytes 150 and 152 are used during microinstruction memory fetches and another pair of address extension bytes 154 and 156 are used during data memory fetches. In this manner, the virtual address extension unit 70 can provide one of four bytes to the main memory 57 on the virtual address 33-40 lines 158. The address extension stored in one of the process context registers 150, 152, 154 and 156, provides for fast presentation of a virtual address extension, which extension relates either to a data access of main memory 57 or a virtual instruction access of main memory 57.

Referring to FIGS. 2, 4 and 5, a 31 bit virtual address 190 is used to access main memory 57. The high order bit 191, whether it be used during a microinstruction fetch or used during a data fetch, is used to control and select either a high or a low context register byte. The 32 bit process context register 150, 152, 154 and 156, comprises four registers, one of which is selected for the virtual address extension. This extension is automatically selected upon a main memory access with the data stored in the selected register appended to the 32 bit address 190 and 191 to provide for a 40 bit extended memory space with a context identifier in the extended eight bits.

It should now become apparent that the context identifier is based upon either a microinstruction fetch or a data fetch, each of which fetch has two available context identifiers, that is, a low and high context identifier all of which are automatically selected for fast context switching with high order 32 bit use for this selection.

In the case of a microinstruction fetch, the instruction segment register 15 bit is used as bit 191. In the case of a data fetch, the address bus 32 bit on line 107 from the MMP 50 is used as bit 191.

Referring to FIGS. 2, 3, 4 and 6, the clock zero line 104 and clock 1 line 134 are non-overlapping clock cycles. In the case of presenting data onto the register data bus 72 or the virtual data bus 62, the clock 1 signal 194 may be extended. A data strobe signal 192 on data strobe line 184, which is used in part for clocking information into privileged registers such as the process context register 150, 152, 154 and 156 is used with the clock 1 signal on line 134 which is extended 194 to provide for data set up time.

Likewise, during microinstruction fetches where a microinstruction miss occurs in the microinstruction cache 54, a clock 1 signal extension 194 is provided so the MMP 50 is delayed time in which the main memory 57 can be accessed without a fault, thereby reducing the execution of overhead instructions. An extension 196 of the clock signal on clock line 104 is use to delay the MMP 50 during trap conditions. Extension of the clock 1 signal 194 for cache misses, and the extension of clock 0 signal 196 for traps, provide for the delay of the MMP 50 so as to vary the instruction cycle times but yet permit efficient execution of microinstructions. Because of this variable cycle time, the saving of machine states is not necessary thereby improving the speed of the direct-execution microprogrammable microprocessor system.

Referring to FIGS. 2 and 7, the instruction storage unit bus 52, comprises the instruction storage unit 1-16 lines 200, which are connected to an instruction storage unit latch 202, which is in turn clocked by an active signal on clock 0 line 104 for storing a relative address from the MMP 50. The outputs of the instruction storage unit latch 202 are presented on instruction storage unit latch 1-16 lines 204. These lines 204 are, in turn, connected to an instruction storage unit comparator 206. The comparator 206, is used to store a previous relative address and compare it to a present relative address.

If the previous relative address is greater than the present relative address, then an active signal is presented on a greater than line 208. If the previous relative address is lesser than the present relative address, then an active signal is presented on a lesser than line 210.

An active signal on a no change line 212 is used to disable an And gate 213, thereby prohibiting an active signal on an increment line 214 while also disabling an And gate 215, thereby also prohibiting an active signal on a decrement line 216. However, if an enabling signal is on the no change line 212, then the And gates 213 and 215 are enabled such that the active signals on the greater than line 208 and lesser than line 210 are presented on the increment line 214 and the decrement line 216, respectively.

The high order bit of the instruction storage unit latch 202 is presented on an instruction storage unit latch 16 line 218 which is connected to an invertor 220 which provides an inverted signal on an instruction storage unit latch inverted 16 line 221. A complete clock line 222 is used to clock the comparator 206 and a flip flop 224. The outputs of the flip flop 224 are presented on a Q line 226 and a Q bar line 228 which flip flop 224 stores the value of a previous high order bit of the previous relative address.

A count clock line 230 is used to enable and provide a pulse to Nand gates 232 and 234. These Nand gates, 232 and 234, are used to present an increment signal on an increment line 236 and a decrement signal on a decrement line 238, respectively. The flip flop 224 is used to present active signals on lines 226 and 228 to Nand gates 232 and 234, respectively.

An active increment signal is presented on line 236 when the present relative address is greater than the previous relative address, and the previous high order bit is true and the present high order bit is false. An active signal is presented on the decrement line 238 when the present relative address is lesser than the previous address, and the previous address high order bit is false and the present high order bit is true.

These increment line 236 and decrement line 238 are presented to a multiplexer 240. This multiplexer 240 provides counting signals on increment A line 241, increment B line 242, decrement A line 243 and decrement B line 244. A primary A line 245 is used to select the outputs of the multiplexer 240.

A load instruction register A line 246 and load instruction register B line 248, are used to load instruction segment A register 250 and instruction segment B register 252, respectively. These registers, 250 and 252, are capable of counting up and down dependent upon active signals on increment A line 241, increment B line 242, decrement B line 243 and decrement B line 244. The instruction segment A register 250 presents a 15 bit segment address on instruction segment A register 1-15 lines 254, and instruction segment B register 252 presents a 15 bit segment address on instruction segment B register 1-15 lines 256.

Lines 254 and 256 are connected to an instruction segment register multiplexer 257, which multiplexer 257 presents an instruction segment register output on instruction segment register 1-15 lines 258. The high order bit of this segment register output is presented on the instruction segment register 15 line 166. The primary A line 245 is used to select between either segment A Register 250 or segment B Register 252. Instruction storage unit latch 4 - 16 lines 259 are connected to a microinstruction driver 260 which presents a 32 bit virtual address onto virtual address 1 - 32 lines 261.

An instruction segment register 262 and an instruction segment driver 264 are used to present the instruction segment address on virtual data 16 - 31 lines 266 and register data 17-32 lines 268, respectively. The instruction segment driver 264 is enabled by an active signal on read instruction segment register line 269, and the instruction segment register 262 is loaded upon an active signal on trap line 270 which active signal on trap line 270 evinces a trap condition.

Register data 17-31 lines 268 are used to load the instruction segment B register 252 and the instruction segment A register 250.

It should now become apparent that a method of determining when to automatically increment or decrement segment registers 250 or 252 is embodied in hardware reflected by outputs on the increment line 236 and decrement line 238. The method comprises comparing the present and previous relative address to determine which is greater than the other while also performing a comparison of the high order bit of the present and previous relative address.

It should also become apparent that the preferred embodiment uses a primary and an alternate segment registers 250 and 252, respectively, the selection of which is controlled by an active signal on the primary A line 245. It should also become apparent that the register data 17 - 31 lines 268 are used to update the two segment registers 250 and 252. However, when the relative microinstruction address crosses an address boundary, automatic increment and decrement of the appropriate segment register 250 or 252 can now occur without the execution of overhead instructions thereby making the direct-execution microprogrammable system more efficient.

It should also become now apparent that a virtual address on virtual address 1 - 32 lines 261 is a combination of the relative address on the instruction storage latch 4 - 16 lines and the segment address of the selected segment register 250 or 252. It is equally apparent that the selected segment register address can either be presented on virtual data 16 - 32 lines 266 when a trap condition occurs or the register data 17-32 lines 268.

Referring to FIGS. 2, 4, 5, 7, 8, and 9 in the event of a microinstruction cache miss, the microinstruction address extension unit 56 in combination with the virtual address extension unit 70 combine to present an effective 40 bit virtual address 274. The eight high order bits of the 40 bit virtual address is the context ID 276 which is provided on the process context register lines 159.

The segment address 278 portion which is bits 18 - 32 of the 40 bit virtual address 274 is provided on the instruction segment register 1 - 15 lines 258. The relative address 279 is provided on the instruction storage unit latch 4 - 16 lines 259. The instruction storage unit latch 4-16 lines 259 correspond to virtual address 5-17 bits 279 of the virtual address 274.

Virtual address 3-4 bits 284 are presented on the virtual address bus as zeros. Additionally, virtual address bits 1 and 2 are also realized as zeros 280 throughout the direct-execution microprogrammable microprocessor system.

In the event of a microinstruction cache miss in which the microinstruction cache 54 will require a main memory 57 microinstruction fetch, four 32 bit words will be read from the main memory 57 and loaded into the microinstruction cache 54. It should be understood that the main memory 57 is organized in 32 bit words each of which comprise four 8-bit bytes. Thus, even though represented as having active zero signals on the lower virtual address 1 and 2 bits 280, the memory system is actually not provided these signals because a word is read in four 8-bit bytes which are read simultaneously. Hence, during a microinstruction cache miss, four 32 bit words are read from main memory 57 which is equal to a 16 byte transfer from main memory 57 to the microinstruction cache 54.

It should now be apparent from the foregoing description that the high order bit of the instruction storage register 258 is to choose between two process context registers 150 or 152 which are used for the main memory access during a microinstruction cache miss.

Referring to FIGS. 2 and 9 the later of which is a schematic diagram of the microinstruction cache 54, instructions segment register 1 - 15 lines 258, process context register 1-8 lines 159 and instruction storage storage unit latch 4 - 16 lines 259 are connected to a hash connector 300 which provides for a mapping of address bits between input lines 258, 259 and 159 and address bits on the hash connector output lines 302. The hash connector output lines 302 are connected to a series of 12 exclusive OR gates 304 providing a 12-bit output on the hash address 0 - 11 lines 306.

These hash address 0 - 11 lines are connected to a microinstruction cache RAM 308. The microinstruction cache RAM 308 presents its output onto the instruction storage unit 1 - 16 lines 200 for MMP 50 access.

During a microinstruction cache miss, the four microinstruction words are loaded into the microinstruction cache RAM 308 by the use of the virtual data 1 - 32 lines 116. An instruction storage unit address buffer 310 is used to pass the microinstruction address presented on the instruction segment register 1 - 15 lines 258, process context register 1 -8 lines 159 and instruction storage unit latch 4 - 16 lines 259 onto instruction segment register B 1 - 15 lines 112, process context register B 1 - 8 lines 314 and instruction storage unit B 4 - 16 lines 316, respectively, which lines 312, 314 and 316 are connected to both an address RAM 318 and an address comparator 320.

The hash address 0 - 11 lines 306 are used to address memory locations in the address RAM 318 and cache RAM 308. The instruction storage register 1 - 15 lines 258, process context register 1 - 8 lines 159 and the instruction storage unit latch 4 - 16 lines 259 are also connected to the address comparator 320.

The address comparator 320 presents an equal output signal on an equal line 322 which is connected to a miss driver 324 which in turn, presents an output signal on an instruction storage unit miss line 326. A valid line 328 is connected to the miss driver 324. When an inactive signal appears on the equal line 322 and when an active is on the valid line 328, an active instruction storage unit miss signal appears on the instruction storage unit miss line 326.

A cache write line 330 is used to write data into the address RAM 318. Write byte lines 332-are used to write microinstructions into the cache RAM 308 when data is presented on virtual data 1 - 32 lines 116. Chip select byte lines 334 are used to enable either the low order 16 bits or the high order 16 bits of one of the four the 32 bit words stored in the cache RAM 308 addressed by the hash address presented on hash address lines 306.

In this manner, the cache RAM 308 stores instructions fetched from main memory 57 based upon the hash address addressing a 16-bit microinstruction which is subsequently presented on the instruction storage unit 1 - 16 lines which are in turn connected to the MMP 50.

To determine whether or not a cache miss has occurred, that is, whether the addressed microinstruction is presently stored in the cache RAM 308, the address RAM 318 presents an address depending upon an active signals on the cache enable lines 336. When enabled, the address RAM 318 presents an address on lines 312, 314 and 316 to the address comparator 320. The address comparator compares the present address presented on lines 258, 259 and 159 with the address provided by the address RAM 318 presented on lines 312, 314 and 316. If the two addresses equal, then an active equal signal appears on the equal line 322. The valid control line 328 is also used to discriminate against an improper cache miss.

The instruction storage unit miss line 326 informs the control logic 84 that an instruction cache miss has occurred and enables a main memory instruction fetch so as to store the four 32-bit microinstruction words into the cache RAM 308.

Context Switching Stack Cache

Referring to FIG. 10, virtual data 1 - 4 lines 400 are connected to a frame address decrement counter 402 and a frame address normal counter 404 for loading a stack cache frame address. An active signal on a pop line 408 which is connected to the frame decrement counter 402 and the frame address normal counter 404, is used to decrement these counters during a pop operation. An active signal on push line 406 which is connected to the frame address decrement counter 402 and the frame address normal counter 404, is used to increment these counters 402 and 404 during a push operation. An active signal on write stack cache register line 410 is used to load the data on virtual data 1 - 4 lines 400 into both the frame address decrement counter 402 and the frame address normal counter 404.

An active signal on clock 1 line 134 clocks flip flop 412. Thus a signal on the write stack line 410 produces an active signal on a Q line 414. The OR gate 416 is used to present an active signal on an OR gate output line 418. The clock signal on clock 1 line 134 causes the frame address decrement counter 402 to be decremented once after an active load signal has been presented on the write stack cache line 410. Thus, the value of the frame address decrement counter 402 is one less than the value in the frame address normal counter 404.

Counter 402 presents a 4 bit address on decrement frame address 1 - 4 lines 420, and the counter 404 presents a normal frame address on normal frame address 1 - 4 lines 422. Lines 420 and lines 422 are connected to the frame address multiplexer 424 which selects either a normal frame address or a decremented frame address depending upon an active signal on a register address 6 line 425.

Which ever counter, 402 or 404, is selected, a frame address is presented on the outputs of the multiplexer 424 on frame address 1 - 4 lines 426 which are connected to a stack cache address low driver 428 and a the stack address high driver 430. Register address 1 - 4, lines 432 are also connected to the driver 428. Driver 428 drives stack cache address 1 - 8 lines 434 and driver 430 drives a high order address, on stack cache 9 - 12 lines 436. Address lines 434 and address lines 436 combine to form a total stack cache address for addressing a stack cache RAM 438.

Data can be written into or read from the stack cache RAM 438 through stack cache data 1- 32 lines 440. A stack cache transceiver 442 can drive or receive data between register data 1 - 32 lines 116 and the data lines 440. An active signal on stack write line 441 causes the writing of information into the stack cache RAM 438 while simultaneously providing appropriate direction control for the transceiver 442. An enable signal on a stack read line 443 enables cache stack data onto the register data 1 - 32 lines 116.

Virtual data 17 - 22 lines 446 are connected to a bank address register 444 which stores data upon an active signal on the write stack cache line 410. The bank address register 444 presents a bank address on bank address lines 448 which are connected to the driver 430 and a virtual data bus driver 450. Virtual data bus driver 450 enables both the frame address on lines 426 and the bank address on lines 448 onto the virtual data 1 - 8, 17 - 24 lines 454, respectively, when an active signal appears on the read stack cache line 452.

The stack cache RAM 438 comprises an array of stacks, each of which is referred to as a bank. The bank address on bank address lines 448 is used to address different banks in the stack cache RAM 438, each of which stack comprises an array of contiguously addressed frames, each of which comprises an array of contiguously addressed words.

The use of two frame counter 402 and 404 provide access to two different contiguous frames in a stack of frames of the stack cache RAM 438. An ability to access two contiguous frames allows for parameter and argument passing between procedural levels when each procedural level is preassigned to a frame. Register address line 6 provides for the selection for either of these two contiguous frames of a stack of frames. Address data on register address 1 - 5 lines 432 provides for the addressing of a particular word in each on the two accessable contiguous frames of the stack of frames.

It should now become apparent that the reading and writing of the stack cache can occur with a single microinstruction execution which provides for signals on the write line 441 and on the read line 442 with appropriate data presented on the register data 1 - 32 lines 116 and the register address lines 432 and 425.

It should also be apparent that the presentation of active signals on the push line 406 and pop line 408 can cause the incrementing and decrementing of counters 402 and 404 for automatic selection of adjacent contiguous frames of a stack of frames located in the stack cache RAM 438. It should equally be apparent that if each frame is preassigned to a process procedural level, procedural level switching, i.e. procedural calls and returns, can be effectuated by a push or pop operation.

If the value of the frame counters 404 or 402 overflow or underflow, respectively, appropriate signals are presented on overflow line 456 and underflow line 458, respectively. These overflow and underflow signals can cause a trap condition to occur. However, in between such conditions, that is between overflow and underflow conditions, a stack of frames is pushed and popped by a single microinstruction execution.

It should also become apparent that the loading of the bank address register 444 with a register write operation by the use of virtual data 17 - 22 lines 446 can cause the immediate selection of another bank, that is, a stack of frames located in the stack cache RAM 438.

It should be equally apparent that if each bank was preassigned to a predetermined process, i.e. context, then changing the bank address by a register write operation would effectuate a context switch within the stack cache RAM 438.

Expanded Address Translation Cache

Referring to FIGS. 2 and more specifically to FIG. 11, which is a schematic of an expanded address translation cache RAM portion 60a, bank select lines 500 and a read-write control line 502 are connected to hash chip select decode logic 504 which drives 4 chip select a-d lines 506 which, in turn, select one of four banks of RAM in an address RAM 508. The hash address RAM 508 has four 29-bit data input- output lines 510a, 510b, 510c and 510d each of which comprise 28 virtual page number address lines and 1 super invalid line.

During a write operation into the address RAM 508, data to the address RAM 508 is presented on the super invalid line 512 and the virtual address latch 13-40 lines 513 which data is presented onto lines 510 through a driver 514 which is enabled by an active signal on an enable register line 515. During a read operation of the address RAM 508, data from the address RAM 508 is presented onto lines 510 which are connected to a comparator 516.

The comparator 516 is used to compare a present address on virtual address latch 13-40 lines 513 with each of the bank outputs on lines 510a, 510b, 510c and 510d of the address RAM 508. If the address on any one of the lines 510 equal the present address on virtual address lines 513, then active signals are presented on hit a - d lines 518. An active signal on hit a-d lines 518 means that the corresponding bank of address RAM 508 presented a virtual page address equal to the virtual page address on virtual address latch 13-40 lines 513. Hence, an active signal on hit a, b, c or d lines 518 reflects that data lines 510 a, b, c or d, respectively, carries the same real page number as on the virtual address latch lines 513.

The super invalid line 512 is used by the operating system to disable the comparison of the comparator 516 even though a hit condition has occurred resulting in an inactive hit signal on hit a - d lines 518.

The hit a-d lines 518 are connected to hit logic 520 which has outputs comprising miss line 522, double hit line 524 and bank code lines 526. The address RAM 508 is written and enabled upon an active signal on a write enable line 528.

Hash logic 530 comprises a plurality of exclusive Or gates to derive a 10 bit hash address on hash address lines 532. The hash logic 530 hashes the address presented on the virtual address latch 13 - 40 lines into a 10 bit hash address on hash address lines 532 which are used to address address RAM 508, RAM 550 and RAM 558.

An address translation cache select decode logic 546 is used for bank selecting by presenting bank select signals on chip select a - d lines 548. These lines 548 carry signals that are a function of the bank select lines 500, hit a - d lines 518 and the read- write line 502. The chip select lines 548 are connected to a reference RAM 550 which stores two status bits presented on page referenced line 552 and page modified line 554 when an inactive signal is presented on reference write enable line 556. During accesses, page modified line 554 and page reference line 552 are activated. An active signal on reference write enable line 556 writes data into the reference RAM 550.

An active signal on the page reference line 552 or the page modification line 554 is used to determine if a page in main memory 57 has been referenced before the current virtual address reference or to determine if that page has been modified by a main memory write operation, respectively.

A page RAM 558 is used to store a real page frame number and status information. An active signal on the write enable line 528 also is used to write data into the page RAM 558. The chip select lines 548 are used to select one of four banks in the page RAM 558 and the reference RAM 550. The address RAM 508, the reference RAM 550 and the page RAM 558 are organized in four banks by 1K words though other numbers may be used.

The address RAM 508 is used to store virtual page numbers, context ID byte and a super invalid bit, whereas, the reference RAM 550 is used to store a page reference bit and a page modification bit, and whereas the page RAM 558 is used to store real page frame numbers and status information. The real page frame number is presented on real page frame number 13 - 28 lines 560. Status information comprise software bits presented on software 1 - 6 lines 562, process access bits presented on user-kernel read-write priority 1 - 4 lines 564, and status bits presented on status lines 568. Status lines 568 include lines 552 and 554. This information is used by the operating system to control and manage the operation of the expanded address translation cache 60.

An active signal on the write hash address line 570 is used to clock the hash address on the hash address lines 532 into a hash address register 572 which presents the hash address on the low order bits of the virtual data 1 - 32 lines 116.

Referring to FIGS. 2 and 11 and more specifically to FIG. 12, which is a schematic of a register portion 60b of the expanded address translation cache 60, a plurality of registers are used to interface the main memory 57 to the virtual address bus 64 and to the virtual data bus 62. Main memory 57 is connected to the expanded address cache 60 by the use of a transceiver 600 which is connected to address data 1 - 32 lines 602. An active signal on the array enable line 604 and on array transceiver line 606 are used to control the transceiver 600 so as to provide bi-directional communication of data between the address data 1 - 32 lines 602 and data bus 1 - 32 lines 608. Data lines 58 comprise address data 1 - 32 lines 602.

A virtual data to main memory latch 610 is controlled by an active strobe signal on virtual data latch enable line 612 and enabled by an active signal on enable virtual bus line 614 so as to store data on the virtual data 1 - 32 lines 116 and present this data onto the data bus lines 608.

A main memory to virtual data latch 616 is used to store data from the main memory 57 and present this data onto the virtual data 1 - 32 lines 116. This main memory to virtual data latch 616 is enabled by an active signal on enable out line 618 and is strobed by an active signal on virtual data latch enable line 620. Hence, the virtual data to main memory latch 610 and the main memory to virtual data latch 616 provide for data transmission to and from the main memory 57.

An address translation read register 622 is connected to a address translation write register 624 the later of which is strobed by an active signal on data strobe line 626 and enabled with an active signal on write data A line 628 providing for the transfer of data on the virtual data 1 - 32 lines 116 onto lines 562, 564, 560, 568. The address translation read register 622 which is clocked upon an active signal on enable address translation read register line 630 presents data on lines 568, 552 and 554 onto the virtual data 1 - 32 lines 116 upon an active signal on read register line 632.

Virtual address latch 1 - 12 lines 633 and virtual address latch 13 - 40 lines 513 are driven by a virtual address latch 634 which is clocked upon an active signal on clock virtual address line 636 and enabled upon an active signal on enable virtual address line 638. A virtual address on virtual address latch 1-40 lines 513 and 633 is loaded into a faulting address register 640 upon an active signal on virtual page register clock line 641 and which faulting address register 640 is enabled upon an active signal on enable faulting address register line 642. When the faulting address register 640 is enabled, data stored in the faulting address register 640 is presented onto the virtual data 1 - 32 lines 116.

A faulting page write register 644 stores data on the virtual data 1-32 lines 116 when strobed by an active signal on a faulting page register latch enable line 645. Data stored in the faulting page write register 644 is enabled onto lines 513, 514 and 500 upon an active signal on faulting page register enable line 646. The faulting page write register 644 is also used to provide bank select signals on bank select lines 500 and the super invalid bit on the super invalid line 514.

The virtual address latch 13 - 40 lines are driven from two sources. The first source is the virtual address latch 634 and, the second is the faulting page write register 644.

The virtual address latch 13 - 40 lines 513 are connected to a faulting page read register 647 which is clocked by an active signal on virtual page register clock line 641 and enabled with an active signal on enable virtual page register line 648.

The outputs of the faulting page read register 647 are connected to the virtual data 1-32 lines 116. The faulting page read register 647 stores a faulting page number on virtual address latch 13-40 lines 513 and a bank code on bank code lines 526 for presentation on the virtual data 1-32 lines 116.

Referring to FIGS. 2, 11, 12 and 13, the virtual address latch 634 is connected to virtual address 1 - 40 lines 261 and is used to store a virtual address. The virtual address latch 634 is used to select address in the address RAM 508, reference RAM 550 and the page RAM 558 which rams are included in the expanded address translation cache RAM portion 60a.

It should now become apparent that during a memory access of main memory 57, a virtual address is presented on virtual address 1 - 40 lines 261 and clocked into virtual address latch 634 which drives virtual address latch 13 - 40 lines 513 which carry the 28 high order virtual address bits. The virtual address latch 13 - 40 lines 513 are presented to the hash logic 530 so as to address a location in address RAM 508.

The address previously written into the address RAM 508 at this location is presented on data lines 510 which are compared with the present upper virtual address bits on virtual address latches 13 - 40 lines 513 by comparator 516 to determine if the present page is stored in main memory 57. If it does compare, then a hit condition occurs and one of four hit lines 518 will have an active signal thereon.

During this comparison, the page RAM 558 and Reference RAM 550 will be addressed based upon the hash address on lines 532 and chip select signals on chip select lines 548. The page RAM 558 will then present a real page frame number address on lines 560 to main memory 57 preceded by a word address presented to main memory 57 on virtual address latch lines 1-12. Hence, address translation is overlapped with main memory word addressing at the start of a memory cycle for increased performance.

After addressing, the main memory 57 can present or store data. The main memory 57 may have a size of up to 256 mega bytes. Depending upon if the memory access is a read or a write, the main memory 57 will either receive or present data on address data lines 602 which will be either derived from or presented onto virtual data lines 116.

In the event of a miss or double hit condition resulting from the comparison of comparator 516, program control of the direct-execution microprogrammable microprocessor system can read from or write to registers 610, 616, 622, 624, 634, 640, 644, 647 or 572 and RAM 558 so as to manage the expanded address translation cache 60.

Double hit and miss conditions cause system trap conditions. During page faults, e.g. a miss, e.g. a double hit, the upper 28 bits of the virtual address on virtual address latch lines 513 are loaded into the faulting page read register 647. A 32 bit word 700 can be read from the faulting page read register 647 which word comprised the bank code number 702, the context ID 703 which is a virtual page extension, and the virtual page number 704. The address causing the fault condition can be read from the faulting address register 640.

During management of the expanded address cache 60, the RAMs 508, 550 and 558 can be written into by writing into a faulting page write register 644 which writing has the effect of addressing the RAMs 508, 550 and 558 by use of the bank select lines 500 and virtual address latch 13-40 lines.

A write to the address translation write register 624 is used to write a real page number word 720 into RAM 558. Word 720 comprises access code 721 which corresponds to four data bits presented on lines 564, status bits 722 presented on lines 568, software bits 724 presented on lines 562, and a real page frame number 726 presented on lines 560. The real page number 726 is the upper 16 bits of the 28 bits that are used to address pages of the main memory 57.

The context ID 703 and virtual page number 704 are hashed to form a hash address on hash address lines 532. The strobing of the hash address register 572 presents a hash word 740 which has its 10 lower bits comprising a hash address 742 with the high order 22 bits not used.

It should now become apparent that the general operation of the expanded address translation cache 60 begins with the presentation of an extended virtual address word 760 which comprises a context ID extension 762, ID selection bit 766 and a 31 bit virtual address 764. The lower 12 bits of the virtual address presented on virtual address 1-32 lines 166 are immediately sent to the main memory 57 on virtual address latch 1 - 12 lines 633 to begin an overlapped memory operation.

The remaining 28 bits of the virtual address, that is data on virtual address latch 13 - 40 line, are hashed into 10 bits 742 and used to address the expanded address translation cache RAMs 508, 550 and 558. The real page frame address on lines 560 is then presented to the main memory 57 to address a page of memory.

A trap will be generated if the MMP 50 accesses main memory resulting in a miss or double hit condition. The MMP 50 may read the faulting page read register 647 to determine the faulting extended virtual page number 703 and 704 and the bank codes 702. The MMP 50 may then present this data on the virtual data lines 116 and writes it into the virtual address latch 634 which causes the addressing of the RAMS 508, 550 and 558 so that the MMP 50 can then read or write data in these RAMS.

It should also become apparent the the direct-execution microprogrammable microprocessor system has a software managed 4K expanded address translation cache 60 with address translations overlapped with main memory accesses.

Control Logic

Referring to FIGS. 2 and 14, the control logic 16 comprises logic elements scattered throughout the system and is primarily responsible for clock generation 800, trap control 802, bus control 804, decode control 806 and miscellaneous control 808. The main purpose of the clock generation control is to provide for clock signals throughout the system. An example of which control is a response to an active signal on the instruction storage unit miss line 326 causing the extension of the clock signal on clock one line 134 as depicted in FIG. 6.

The trap control logic provides for the trapping of the MMP 50. An examples of which would be an overflow or underflow signal occurring on overflow line 456 or underflow line 458, respectively, thereby causing an active signal on the trap line 270. This is merely an example of a trap condition and there are other trap conditions that may occur, for example, an expanded address translation cache miss.

The bus control 804 provides for the bus arbitration in the system. One signal useful for this would be a memory busy signal on the memory busy line 809 that would be used by the bus control logic to provide signals on bus control lines 814.

The decode control 806 is used for providing decode logic control for the system using decode control lines 816. The register address 1 - 8 lines 138 are used to provide signals to the various subsystems and the decode control 806 in the direct-execution microprogrammable microprocessor system. Other inputs to the decode control would include the EREP line 818, MAE line 820 and PVT line 822 from the MMP 50. The output of the decode control 806 provides write and read signals and other control signals to various subsystems in the direct-execution microprogrammable microprocessor system on the decode control lines 816.

The miscellaneous control 808 is used for other miscellaneous control functions using the miscellaneous input control lines 824 and virtual data 1 - 32 lines 116 while providing outputs on miscellaneous output control lines 826.

Referring to FIG. 2, those skilled in the art would appreciate the need for various control logic 16 to help control and move data throughout the system. Those skilled in the art would know how to design such control features.

The extended arithmetric unit 82 is addressed and access through the register address bus 78 and register data bus 82. Those skilled in the art would appreciate and know now to design an extended arithmetic unit 82. Those skilled in the art would also appreciate and know how to design an I/O Gateway unit 86.

Reduced Instruction Set

The direct-execution microprogrammable microprocessor system uses the NCR 32000 microprocessor (MMP 50) though other microprogrammable microprocessors may be used. The instruction set of MMP 50 is a relatively primitive one in that the instructions are simple and register oriented.

The system uses a subset of the instruction set thereby executing a primitive and reduced instruction set. Also, some instructions have been redefined. The following table lists those instructions which are relatively complicated and are not used.

| TABLE OF UNUSED MICROINSTRUCTIONS | | |
|---|---|---|
| Op-code | Mnemonic | Instruction |
| 03 | FR | Fetch Real |
| 2E | SETIA | IBM Setup Assist A |
| 2F | SETNA | NVM Setup Assist A |
| 32 | JMPIA | IBM Setup Jump A |
| 33 | JMPIB | IBM Setup Jump B |
| 34 | JMPIC | IBM Setup Jump C |
| 35 | JMPNA | NVM Setup Jump A |
| 36 | JMPNB | NVM Setup Jump B |
| 37 | JMPNC | NVM Setup Jump C |
| 38 | JMPVA | VRX Setup Jump A |
| 39 | JMPVB | VRX Setup Jump B |

-continued

TABLE OF UNUSED MICROINSTRUCTIONS

| 3A | JMPVC | VRX Setup Jump C |
|---|---|---|
| 3B | JMPD | NVM Descriptor Jump |
| 54 | MII | Map IBM Indicators |
| 55 | MIN | Map NVM Indicators |
| 56 | MIV | Map VRX Indicators |
| 5F | CBFU | Compare Byte To Field Unsigned |
| 61 | LINKM | Load Link Address Minus |
| 64 | RIBO | Return On Indicator Bit Pair Ones |
| 65 | DRIBO | Delayed Return On Indicator Bit Pair Ones |
| 66 | RIBZ | Return On Indicator Bit Pair Zero |
| 67 | DRIBZ | Delayed Return On Indicator Bit Pair Zero |
| 68 | JFA | Jump On Field Array |
| 69 | DJFA | Jump On Field Array With Link |
| 70-7F | JIOL | Jump On Indicators Ones With Link |
| 80-8F | JIZL | Jump On Indicators Zeros With Link |
| 92 | LINK | Load Link Address |
| 96 | TSB | Transfer Byte From Setup |
| 97 | TSLDC | Transfer Left Digit From Setup And Clear |
| 98 | TSRDC | Transfer Right Digit From Setup And Clear |
| 99 | TSBC | Transfer Byte From Setup And Clear |
| B0 | JRPX | Jump Relative Plus External |

Redefined Instructions

The RTI instruction was redefined as an RFE (return from exception) instruction. During an execution cycle when a trap condition (exception) exists and is signaled to the MMP 50 on the trap line 270, the MMP 50 will respond to that trap condition by saving pipeline information in alternate registers of the MMP 50. The MMP 50 will then start fetching from location zero as part of a trap recovery routine.

In addition to saving the pipeline information, the MMP 50 provides a means of saving states if a trap condition occurs during a main memory 57 fetch or store operation. As part of the trap recovery routine and after the fault condition has been corrected, the MMP 50 can execute a Memory Reference Retry (MRR) instruction that will use the information and states that were saved as a result of the previously faulting fetch or store operation.

The final operation of the trap recovery routine is the execution of three consecutive RFE instructions which restores the states and pipeline of the MMP 50 to the values saved when the trap originally occurred.

RFE instruction activates the PMWT lines (not shown) of the MMP 50 with a field of the instruction specifying the value on the PMWT0 and PMWT1 lines during clock one signal. These PMWT lines (not shown) provide control signals for the system.

The three RFE instructions provide a mechanism for restoring the MMP 50 to its original state after the trap recovery routine has been processed. The first of the sequence of three RFE instructions is used to return the system to the original state after the trap condition. It switches the segment register 250 with the segment register 252. It also fetches an instruction at the top of a restore FIFO (not shown) of the MMP 50 into the pipeline of the MMP 50.

The second of the sequence of three RFE instructions fetches the next instruction in the restore FIFO into the execution pipeline. The third and last of the sequence of three RFE instructions is used to return the MMP 50 to the original state after the trap condition. It restores the final instruction in the restore FIFO into the execution pipeline. Then the MMP 50 resumes normal operation.

It should now be apparent that the RTI instruction now operates as an RFE instruction for trap recovery by restoring the pipeline of the MMP 50 and altering external registers, e.g. segment registers 250 and 252, rather than simply returning from an interrupt.

The LFAL instruction was redefined as a FD (fetch double) instruction. Bit 1 and 2 of the PM bus 68 are used as control lines during the execution of the FD instruction. This FD instruction is used to fetch two 32-bit words without allowing an intervening trap condition.

Hence, when a FD instruction is executed, the system recognizes this execution. If a trap condition occurs during this execution, a double fetch from main memory will continue with the two 32 bit words saved in external registers. Upon completion of a trap recovery routine, the saved two 32 bit words are made available to the MMP 50 by executing two consecutive RCV instructions. Thus, the use of the LFAL is effective as a double fetch from main memory 57 indifferent to a possible trap condition.

The SR instruction was redefined as a TTIOS (transfer to input-output subsystem) instruction. The MMP 50 activates the MAE control line 820 and has address bit 32 of PM bus 68 false when executing the TTIOS instruction. This is recognized by the system and causes a request to the I/O Gateway unit 86 with a 24 bit address presented on the Virtual Address bus 64 to address memory the I/O Gateway unit 86. In this manner, the I/O Gateway 86 is mapped to real memory with the TTIOS instruction redefined to effectuate input-output transfers.

What is claimed is:

1. A direct-execution microprogrammable microprocessor system, comprising,
    microprogrammable microprocessor means for executing microinstructions,
    microinstruction address extension unit means connected to said microprogrammable microprocessor means for extending microinstruction address space of said microprogrammable microprocessor means, and
    main memory means connected to said microinstruction address extension unit means for storing data and said microinstructions.

2. The direct-execution microprogrammable microprocessor of claim 1 further comprising,
    processor memory bus means connecting said main memory means to said microprogrammable microprocessor means, said processor memory bus means serving to communicate data therebetween.

3. A direct-execution microprogrammable microprocessor system directly executing a primitive instruction set of microinstructions comprising,
    microprogrammable microprocessor means for executing said microinstructions,
    microinstruction addressing means for extending a microinstruction address space and for storing said microinstructions, said microinstruction addressing means connected to said microprogrammable microprocessor means,
    memory subsystem means for storing data and said microinstructions,
    system bus means connected to said microprogrammable microprocessor means, microinstruction addressing means and memory subsystem means, said system bus means serving to communicate data between said microprogrammable microprocessor means and memory subsystems means and serving to communicate microinstructions between said memory subsystem means and said microinstruction addressing means, and control logic means for controlling the operation of said direct-execution microprogrammable microprocessor system, said control logic means connected to said microprogrammable microprocessor means, said microinstruction addressing means, said memory sybsystem means and said system bus means.

4. The direct-execution microprogrammable microprocessor system of claim 3 wherein said microinstruction addressing means comprises, microinstruction address extension unit means connected to said microprogrammable microprocessor means and said system bus means, said microinstruction address extension unit means serving to extend a microinstruction address space, and microinstruction cache means connected to said microprogrammable microprocessor means, said system bus means and said microinstruction address extension unit means, said microinstruction cache means operating to store microinstructions also stored in said memory subsystem means.

5. The direct-execution microprogrammable microprocessor system of claim 3 wherein said memory subsystem means comprises, main memory means for storing said microinstructions and said data, and extended address translation cache means connected to said main memory means and said system bus means, said extended address translation cache means serving to store address translations and serving to overlap address translations and accesses of said main memory.

6. The direct-execution microprogrammable microprocessor system of claim 5, wherein said address translation cache means comprises RAM means for storing addresses, translated addresses and status data, said RAM means connected to said main memory means for accessing said main memory means, translations means for translating addresses, said translations means connected to said RAM means, and register communication path means connecting to said main memory means, said RAM means, said translations means and said system bus means, said communication path means serving to communicate said addresses, said translated addresses, said data, said status data, or said microinstructions, while said RAM means and said register communication path means addresses said main memory means.

7. The direct-execution microprogrammable microprocessor system of claim 3 wherein said system bus means comprises, processor memory bus means for communicating data, said processor memory bus means connected to said microprogrammable microprocessor means, system multiplexer means for multiplexing data on said processor memory bus means, said system multiplexer means connected to said processor memory bus means, and virtual bus means connected to said system muliplexer means, said microinstruction addressing means and said memory subsystem means, said virtual bus means serving to communicate said microinstructions and said data.

8. The direct-execution microprogrammable microprocessor system of claim 7, wherein said system bus means further comprises register means for storing data, and register bus means connected to said system multiplexer means, said memory addressing means and said register means, said register bus means serving to communicate data.

9. The direct-execution microprogrammable microprocessor system of claim 3, wherein said control logic means further comprises clock extension means for varying the execution rate of said microprogrammable microprocessor means, said clock extension means serving to provide time in which said memory subsystem is accessed, said clock extension means connected to said microprogrammable microprocessor means, and miss detection means for detecting when a microinstruction is not stored in said microinstruction addressing means, said miss detection means connected to said microinstruction addressing means, said miss detection means connected to said clock extension means, said miss detection means serving to control said clock extension means.

10. The direct-execution microprogrammable microprocessor system of claim 3 further comprising, context switching stack cache means for storing data and for context or procedural switching, said context switching stack cache means connected to said system bus means.

11. The direct-execution microprogrammable microprocessor of claim 3 further comprising, a virtual address extension unit means for address extension or context switching, said virtual address extension unit means connected to said system bus means.

12. A direct-execution microprogrammable microprocessor system including input-output means, said direct-execution microprogrammable microprocessor system executing a primitive microinstruction set of microinstructions comprising, microprogrammable microprocessor means for executing said microinstructions, instruction storage unit bus means connected to said microprogrammable microprocessor means, said instruction storage unit bus means serving to communicate relative addresses and said microinstructions, microinstruction address extension unit means for extending a microinstruction address space, said microinstruction address extension unit means connected to said instruction storage unit bus means, microinstruction cache means for storing said microinstructions, said microinstruction cache means connected to said instruction storage unit bus means and microinstruction address extension unit means, processor memory bus means connected to said microprogrammable microprocessor means, said processor memory bus means serving to communicate data, system bus means connected to said input-output means, said processor memory bus means, said microinstruction address extension unit means and microinstruction cache means, said system bus means serving to multiplex and communicate data and said microinstructions, memory subsystem means for storing said data and said microinstructions, said memory subsystem means connected to said system multiplexer means, and control logic means for controlling said direct-execution microprogrammable microprocessor system, said control logic means connected to said microprogrammable microprocessor means, said microinstruction cache means, said microinstruction address extension unit means and system bus means.

13. The direct-execution microprogrammable microprocessor system of claim 12, wherein said system bus means comprises virtual bus means for mapping said memory subsystem means to virtual addresses, and for mapping said input-output means to real addresses, said virtual bus means connected to said memory subsystem means, said microinstruction cache means, said input-output means and said microinstruction address extension unit means, said virtual bus means serving to communicate data and microinstructions, and system multiplexer means connected said virtual address bus means and said processor memory bus means, said system multiplexer means serving to multiplex data therebetween.

14. The direct-execution microprogrammable microprocessor system of claim 13, wherein said system bus means further comprises register means for storing said data, and register bus means connected to said system multiplexer means, said microinstruction cache means, said microinstruction address extension unit means and said register means, said register bus means serving to communicate said data.

15. The direct-execution microproogrammable microprocessor system of claim 12, wherein said memory subsystem means comprises main memory means for storing data and said microinstructions, RAM means for storing addresses, translated addresses and status data, said RAM means connected to said main memory means, RAM means operating to provide addresses to said main memory means, and register communication path means connecting to said main memory means, said RAM means and said system bus means, said register communication path means for communicating said addresses, said translation addresses, said data or said microinstructions while said RAM means addresses said main memory means.

16. The direct-execution microprogrammable microprocessor system of claim 12 further comprising, context switch stack cache means for context or procedural switching, said context switch stack cache means connected to said system bus means for storing said data.

17. The direct-execution microprogrammable microprocessor system of claim 12 further comprising, a virtual address extension unit means for address extension or context switching, said virtual address extension unit means connected to said system bus means.

18. A direct-execution microprogrammable microprocessor system for directly executing a reduced and redefined primitive instruction set of microinstructions comprising, microprogram microprocessor means for executing said microinstructions, microinstruction addressing means connected to said microprogrammable microprocessor means, said microinstruction addressing means serving to extend a microinstruction address space and operating to store said microinstructions, memory subsystem means for storing data and said microinstructions executed by said microprogrammable microprocessor means, systems bus means connected to said microprogrammable microprogrammable microprocessor means, said microinstruction addressing means and memory subsystem means, said system bus means serving to communicate data between said microprogrammable microprocessor means and memory subsystem means and serving to communicate said microinstructions between said memory subsystem means and said microinstruction addressing means, and control logic means for controlling the operation of said direct-execution microprogrammable microprocessor system, said control logic means connected to said microprogrammable microprocessor means, said microinstruction addressing means, said memory sybsystem means and said system bus means.

19. The direct-execution microprocessor means of claim 18 further comprising, fetch double detection means for detecting the execution of a redefined fetch double instruction, said fetch double detection means connected to said microprogrammable microprocessor means, and memory means for saving a double word, said memory means connected to said microprogrammable microprocessor means, said fetch double detection means, said control logic and said memory subsystem means.

20. The direct-execution microprogrammable microprocessor means of claim 18 further comprising, input-output means connected to said system bus means serving to communicate data or instructions, and input-output control means for controlling the communication between said input-output means and said system bus means, said input-output control means connected to said microprogrammable microprocessor means for detecting the execution of redefined transfer to input-output subsystem instructions and connected to said input-output means and said control logic means.

* * * * *